United States Patent [19]
Lee

[11] Patent Number: 5,855,861
[45] Date of Patent: Jan. 5, 1999

[54] METHOD AND APPARATUS FOR MAKING AQUEOUS CHLORINE DIOXIDE

[75] Inventor: Sunggyu Lee, Akron, Ohio

[73] Assignee: Water Technologies Limited, Charlotte, N.C.

[21] Appl. No.: 606,283

[22] Filed: Feb. 23, 1996

[51] Int. Cl.[6] ............................................ C01B 11/02
[52] U.S. Cl. .............................................. 423/477; 95/265
[58] Field of Search ................ 423/477; 252/187.21; 95/265, 171; 96/202

[56] References Cited

U.S. PATENT DOCUMENTS

| | | | |
|---|---|---|---|
| 3,764,663 | 10/1973 | Sims et al. | 423/478 |
| 3,854,901 | 12/1974 | Cowley | 95/171 |
| 3,867,509 | 2/1975 | Greiger et al. | 423/236 |
| 4,084,747 | 4/1978 | Alliger | 424/65 |
| 4,247,531 | 1/1981 | Hicks | 423/477 |
| 4,250,144 | 2/1981 | Ratigan | 422/112 |
| 4,292,292 | 9/1981 | Hicks et al. | 423/477 |
| 4,534,952 | 8/1985 | Rapson et al. | 423/478 |
| 4,538,545 | 9/1985 | English et al. | 118/679 |
| 4,542,008 | 9/1985 | Capuano et al. | 423/477 |
| 4,547,381 | 10/1985 | Mason et al. | 426/316 |
| 4,585,482 | 4/1986 | Tice et al. | 106/15.05 |
| 4,590,057 | 5/1986 | Hicks | 423/477 |
| 4,689,169 | 8/1987 | Mason et al. | 252/186.24 |
| 4,731,193 | 3/1988 | Mason et al. | 252/95 |
| 4,801,353 | 1/1989 | Mason | 162/73 |
| 4,889,654 | 12/1989 | Mason et al. | 252/100 |
| 4,925,645 | 5/1990 | Mason | 423/477 |
| 4,944,920 | 7/1990 | Rubinstein | 422/37 |
| 4,945,992 | 8/1990 | Sacco | 166/310 |
| 4,968,501 | 11/1990 | Mason | 423/243 |
| 5,008,096 | 4/1991 | Ringo | 423/477 |
| 5,122,282 | 6/1992 | Mason | 210/754 |
| 5,165,910 | 11/1992 | Oikawa et al. | 423/477 |
| 5,171,442 | 12/1992 | Nakshbendi | 210/256 |
| 5,211,912 | 5/1993 | Rubinstein | 422/37 |
| 5,360,574 | 11/1994 | Iwahashi | 252/187.21 |
| 5,380,517 | 1/1995 | Sokol | 423/478 |
| 5,380,518 | 1/1995 | Roozdar | 423/477 |
| 5,389,126 | 2/1995 | Baker et al. | 95/265 |

FOREIGN PATENT DOCUMENTS

| | | |
|---|---|---|
| 959238 | 12/1974 | Canada . |
| 9001457 | 2/1990 | WIPO . |
| 9317960 | 9/1993 | WIPO . |

*Primary Examiner*—Jay H. Woo
*Assistant Examiner*—Betsey J. Morrison
*Attorney, Agent, or Firm*—Foley & Lardner

[57] ABSTRACT

A method of forming an aqueous chlorine dioxide solution is disclosed which includes reacting in a reaction vessel an acid reaction solution containing a hydroxy carboxylic acid and a companion acid with an alkali metal salt of a chlorite ion. In accordance with the process, the hydroxy carboxylic acid serves to temporarily transfer chlorine from and does not form a salt with the alkali metal salt of a chlorite ion. The aqueous chlorine dioxide solution produced is substantially free of chlorous acid and preferably is free of other by-products such as sodium chloride and free chlorine. The method further includes maintaining the reaction vessel at a pH of less than 5 and/or withdrawing at least a portion of the chlorine dioxide from the aqueous chlorine dioxide solution. The method enables rapid, efficient, compact and safe generation of chlorine dioxide. A method of disinfecting water, and apparatus for making chlorine dioxide and for disinfecting water also are provided.

31 Claims, 17 Drawing Sheets

METHOD AND APPARATUS FOR MAKING AQUEOUS CHLORINE DIOXIDE

BACKGROUND OF THE INVENTION

1. Field of the Invention

This disclosure provides processes and apparatus for the production of chlorine dioxide. More particularly, the present invention is directed to processes and apparatus for production of a high concentration aqueous solution of chlorine dioxide without producing undesirable side products such as free chlorine or chlorous acid. The chlorine dioxide according to the present invention can be produced on site and can be used, inter alia, as a disinfectant in the treatment of water and wastewater.

2. Description of Related Art

Chlorine dioxide is a strong oxidant which has been receiving increased attention as an alternative to chlorine for the disinfection and taste/odor (T/O) control of water and waste water. The molecular formula of chlorine dioxide is expressed as $ClO_2$. As implied from its chemical formula, it has the disinfecting properties of both chlorine and oxygen. Moreover, chlorine dioxide exhibits promise of good disinfection performance without the disadvantages of forming large quantities of undesirable chlorinated byproducts since it does not react with hydrocarbons to form chlorinated hydrocarbons.

Chlorine dioxide ($ClO_2$) first was discovered in 1811 in the form of a greenish yellow gas by Sir Humphrey Davy, by reacting potassium chlorate ($KClO_3$) with hydrochloric acid (HCl). It later was found that $ClO_2$ could be used in a dilute acetic acid ($CH_3COOH$) solution for the bleaching of paper pulp. Even though the outstanding disinfecting properties of chlorine dioxide have been constantly noted, its practical application was hampered due to the lack of a safe and economical way of synthesizing it. In the 1930's, the Mathieson Alkali Works developed the first commercial process for making $ClO_2$, from sodium chlorate ($NaClO_3$) via sodium chlorite ($NaClO_2$).

In 1944, the Niagara Falls Water Treatment Plant No. 2 was the first U.S. water treatment facility to use $ClO_2$. $ClO_2$ was used to treat a potable water supply for taste and odor (T/O) control, especially T/O from phenolic compounds. Industrial waste water streams commonly contain phenolic compounds and ammonium salts. Other U.S. plants soon after adopted $ClO_2$ for water treatment; for example, Greenwood, S.C., Tonawanda, N.Y., Lockport, N.Y., etc. By 1958, over 150 municipal water plants adopted $ClO_2$. In 1978, a survey showed that 84 U.S. plants were using $ClO_2$ and that most of these plants were older plants. In Europe, over 500 water treatment plants were believed to be using $ClO_2$ for water treatment in 1978.

In the 1990's, the U.S. EPA recommended that, as a part of the reauthorization of the Clean Water Act, a study should be undertaken to develop a strategy to prohibit, reduce, or find substitutes for the use of chlorine and chlorinated compounds. In recent years, free chlorine ($Cl_2$) has been criticized by environmentalists, even though it is one of the most heavily used chemicals in various chemical and environmental applications. The disadvantages associated with using free chlorine can be summarized as follows:

(1) It is quite reactive with various substances including water, ammonia, and hydrocarbons;
(2) Even with water, it reacts to produce hydrochloric acid and hypochlorite;
(3) Solubility in water is relatively low making it difficult to adequately disinfect without affecting the vapor space above;
(4) Chlorine is not effective in taste and odor (T/O) control, due to its low water solubility, own pungent odor, and acidic reaction; and
(5) It is produced only as a bulk chemical commodity. A small batch capability does not exist, because on-site generation of chlorine is commercially unattractive. This makes chlorine unsuitable for waste water treatment.

For at least these reasons, the replacement of chlorine with other chemicals such as chlorine dioxide has been the subject of a great deal of interest in the recent years.

Chlorine dioxide is known to be an excellent disinfectant as well as a strong oxidizing agent. Its bactericidal, fungicidal, algicidal, bleaching, and deodorizing properties are well documented in various sources of literature. Chlorine dioxide is soluble in water at room temperature (20° C.) to about 2.9 grams $ClO_2$ per liter of water at 30 mmHg partial pressure of $ClO_2$, or 8 grams per liter at 80 mmHg partial pressure. $ClO_2$ is approximately 5 times more soluble in water than chlorine gas ($Cl_2$). $ClO_2$ is much more soluble in water than oxygen ($O_2$) which only has 9.2 mg solubility per liter of water. The presence of chlorine dioxide in water is very easily detected by a color change. The color in water changes from yellowish green to orange red as the concentration of $ClO_2$ increases in water. At low temperatures, chlorine dioxide dissolves in water to a substantially greater extent due to lower vapor pressure, e.g., 12 g/L at 60 mmHg of partial pressure and 10° C. FIG. 1 shows the solubility of $ClO_2$ in water as a function of temperature. It can be seen that a lower temperature is preferred for higher aqueous solubility.

The boiling point (b.p.) of liquid $ClO_2$ is 11° C. and the melting point (m.p.) is minus 59° C. Gaseous $ClO_2$ has a density of 2.4 (when taking air as 1.0) and its molecular weight is 67.45 g/mol, i.e., it is a heavier gas than air. If chlorine dioxide is leaked into the air, it will tend to stay low, near the ground, then gradually diffuse into the atmosphere.

Chlorine dioxide ($ClO_2$) differs from $Cl_2$ in that $ClO_2$ does not react with water or ammonia. Also, unlike chlorine, $ClO_2$ does not produce chlorinated hydrocarbons after reacting with hydrocarbons. In general, $ClO_2$ is less corrosive to most metallic and nonmetallic substances than chlorine, which is an important advantage.

It is also notable that $ClO_2$ is quite volatile and therefore can be removed easily from aqueous solutions with minimum aeration. Concentrations of $ClO_2$ in air above 11% can be mildly explosive. Due to the chlorine dioxide's relative instability and volatility, storage and transportation seem intuitively less economical, even though it is conceivable to store it in a compressed container. In this regard, the strategy of $ClO_2$ production can be two-fold, viz., either on-site production or high purity compressed $ClO_2$.

There have been several, but primarily three basic processes developed for the synthesis of $ClO_2$ that have been commercially applied to water treatment operations. All three processes involve sodium chlorite ($NaClO_2$) as one of the starting raw materials. The basic process chemistry of the three processes are discussed below.

Process 1: Process with Sodium Chlorite and Strong Acid

In this process, a strong acid is used along with sodium chlorite. The strong acid normally is hydrochloric acid or sulfuric acid. Using hydrochloric acid, the reaction stoichiometry is:

$$5\ NaClO_2 + 4HCl \rightarrow 4ClO_2 + 5\ NaCl + 2\ H_2O \quad \text{(R1)}$$

As shown, for every mole of $ClO_2$ (i.e., 67.45 grams of $ClO_2$) to be produced, the reaction requires 1.25 moles of sodium chlorite (i.e., 113.06 grams of $NaClO_2$) and another mole of hydrogen chloride (i.e., 36.45 grams of HCl), assuming there is 100% conversion efficiency, which is impossible to expect from this process. Furthermore, 1.25 moles of sodium chloride salt (i.e., 73.13 grams of salt) are a by-product of each mole of chlorine dioxide produced.

Alternatively, chlorine dioxide can be produced using sulfuric acid, according to the following reaction:

$$10\ NaClO_2 + 5\ H_2SO_4 \rightarrow 8\ ClO_2 + 5\ Na_2SO_4 + 2\ HCl + 4\ H_2O \quad (R2)$$

A very similar situation to the above HCl case is expected, i.e., requirement of strong acid and production of sodium sulfate salt. Again, strong acids are disadvantageous due to their corrosive behavior, and the formation of large quantities of alkali metal salts such as sodium salts is disadvantageous because such salts typically must be removed by extraneous purification techniques. Of these two options, the HCl route seems to be more popular.

Process 2: Process with Sodium Chlorite and Gaseous Chlorine

This process uses gaseous chlorine along with sodium chlorite. The process operates in two stages, first beginning with the formation of an aqueous hypochlorous acid, i.e., $$Cl_2 + H_2O \rightarrow HOCl + HCl \quad (R3)$$

The intermediate product, hypochlorous acid (HOCl), in turn reacts with sodium chlorite to form chlorine dioxide ($ClO_2$), i.e., $$HOCl + HCl + 2\ NaClO_2 \rightarrow 2\ ClO_2 + 2\ NaCl + H_2O \quad (R4)$$

The stoichiometric reaction, which is a summation of the two, becomes $$Cl_2 + 2\ NaClO_2 \rightarrow 2\ ClO_2 + 2\ NaCl \quad (R5)$$

This process, however, involves chlorine and its attendant disadvantages. Furthermore, the process also involves an unstable intermediate, HOCl, thereby substantially limiting the process efficiency. The formation of chlorous acid (HOCl) can be very hazardous at elevated temperatures due to its volatility and propensity to release toxic chlorine gas. A fairly sizable amount of salt production also occurs.

Process 3: Process with Sodium Chlorite and Sodium Hypochlorite

In this process, sodium hypochlorite (NaOCl) is used as a raw material along with sodium chlorite:

$$NaOCl + HCl \rightarrow NaCl + HOCl \quad (R6)$$

$$HCl + HOCl + 2\ NaClO_2 \rightarrow 2ClO_2 + 2\ NaCl + H_2O \quad (R7)$$

This process has several similarities with the earlier two processes, i.e., involvement of hypochlorous acid (HOCl), use of strong hydrochloric acid as a raw material, byproduct salt formation, etc. Due to the presence of sodium hypochlorite, the process intuitively seems to provide more bleaching possibility.

For much larger users of $ClO_2$, such as for bleaching paper pulps, chlorine dioxide demands are much higher than in water treatment plants. In such applications, the sodium chlorite production step can become a part of the entire $ClO_2$ generation process. This process has major drawbacks of using (1) sodium hypochlorite (NaOCl) that is expensive, and (2) hydrochloric acid (HCl) that is strongly corrosive.

U.S. Pat. Nos. 4,925,645 and 5,122,282 describe a process for the production of chlorine dioxide, and a method of treating water and/or wastewater using chlorine dioxide, respectively. According to these patents, the process of making chlorine dioxide includes the steps of combining lactic acid or citric acid with sodium chlorite or alkaline earth metal to yield a salt of an acid and chlorous acid. They state further that the products produced from the methods described therein include, inter alia, chlorine dioxide, as well as free chlorine, chlorous acid and chloric acid. The reaction mechanisms described therein are as follows:

1. $CH_3CH(OH)COOH$ (lactic acid) $+ NaClO_2$ (sodium chlorite) $\longrightarrow$ $CH_3CH(OH)COONa$ (salt of lactic acid) $+ HClO_2$ (chlorous acid)      (R8)

2a. $HClO_2 +$ Non Fully Oxidized Organics, Inorganics or Pathogens $\longrightarrow$ $HClO +$ Oxidized Organics, Inorganics or Pathogens      (R9a)

2b. $2HClO_2 \longrightarrow HClO +$ (Hypochlorous acid) $HClO_3$ (chloric acid)      (R9b)

3. $HClO + 2HClO_2 \longrightarrow 2ClO_2 + H_2O + HCl$ (This reaction occurs in absence chloric ion)      (R10)

4. $ClO_2 +$ Non Fully Oxidized Organics, Inorganics or Pathogens $\longrightarrow HClO_2 +$ Oxidized Organics, Inorganics or Pathogens      (R11)

5. $HClO + Cl^- + H^+ \rightleftarrows Cl_2 + H_2O$      (R12)

6. $Cl_2 +$ Organics, Inorganics or Pathogens $\longrightarrow$ Oxidized Organics, Inorganics or Pathogens      (R13)

The chlorine dioxide along with co-produced chlorine gas and chlorous acid are described by these patents as having the biocidal effect. As described above, the co-production of these chemicals is hazardous and disadvantageous. In addition, these patents claim to produce a chlorine dioxide solution that is stable for over 30 days. The present inventor has found that aqueous solutions of chlorine dioxide cannot remain stable under normal conditions for 30 days using the guidelines provided in those patents. Due to the inherent instability of aqueous chlorine dioxide solutions, the present processes and apparatus are intended to be used to manufacture chlorine dioxide on-site.

U.S. Pat. No. 4,084,747 describes a chlorine dioxide germ killing composition which is produced by contacting an acid material with sodium chlorite in an aqueous medium with a pH of less than 7. The '747 patent states that the lactic acid can be used in conjunction with other organic and inorganic acids. Disadvantages are described, however, when combinations of lactic acid and additional acids are used, compared to lactic acid alone. In addition, the '747 patent discloses a process by which undesirable by-products such as sodium lactate and chlorous acid are produced and hence, must be removed. The chlorine dioxide is used in a concentration of from 100 to 500 ppm up to 2700 to 3300 ppm.

U.S. Pat. No. 4,585,482 describes a process for producing a biocidal composition which liberates chlorine dioxide. The composition releases the chlorine dioxide when the pH is lowered to less than about 7 by an organic acid generating polymer. Thus, these documents describe a process for producing chlorine dioxide which involves either (i) the use of free chlorine or corrosive strong acids such as HCl and $H_2SO_4$ or (ii) the co-production of hazardous by-products such as free chlorine, chlorous acid, and the like.

Conventional chlorine dioxide solutions prepared using methods disclosed in the aforementioned prior art suffer from the drawbacks that they produce undesirable by-products. In addition, the reactions involved using the methods described, i.e., merely mixing the reactants in a reactor usually at ambient temperatures and pressures, or slight modifications thereof, proceed at commercially unacceptable slow rates and produce relatively low concentrations of chlorine dioxide, i.e., on the order of less than about 5,000 mg/l of chlorine dioxide.

Thus, there exists a need to provide an economic and efficient method for producing chlorine dioxide that does not also produce hazardous by-products (e.g., chlorine or chlorous acid), as well as substantial amounts of unusable salts (e.g., sodium chloride, sodium lactate). There also exists a need for a method of producing chlorine dioxide that does not suffer from the aforementioned disadvantages with respect to the slow rate of reaction and the low concentrations of chlorine dioxide. Lastly, there exists a need for an apparatus capable of accomplishing such methods.

SUMMARY OF THE INVENTION

An object of the present invention is therefore to provide a process for the production of chlorine dioxide that does not suffer from the drawbacks of the known art described above. Another object of the present invention is to provide a process of treating water whereby an effective amount of a chlorine dioxide solution is added to water to produce the desired disinfectant property.

An additional object of the present invention is to provide a process and apparatus for the production of chlorine dioxide which have:

simplified reproducible chemistry;

the use of weaker acids and less acid than the processes of the related art;

no chlorine or chlorous acid produced as byproducts;

mild reaction conditions;

a high selectivity of chlorine dioxide and minimum selectivity of undesired byproducts;

an increased reaction rate to decrease total reaction time;

a low capital investment requirement; and a high yield of chlorine dioxide.

In accomplishing the foregoing objects, there is provided according to one aspect of the invention, a process for producing chlorine dioxide. The process comprises the first steps of providing an aqueous acid solution. The solution comprises a hydroxy carboxylic acid and a companion acid. The hydroxy carboxylic acid is capable of temporarily transferring chlorine from an alkali metal salt of chlorite ion, but substantially does not form a salt with an alkali metal salt of a chlorite ion. The companion acid substantially does not react directly with an alkali metal salt of a chlorite ion.

The aqueous solution then is combined, in a vessel, with an alkali metal salt of a chlorite ion, to yield an aqueous reaction solution. Chlorite ions are produced in the aqueous reaction solution, and the chlorite ions then react with the hydroxy carboxylic acid present therein to yield an aqueous product solution that comprises chlorine dioxide but is substantially free of chlorous acid.

An additional object of the invention is to provide a method of disinfecting water whereby a chlorine dioxide solution prepared in accordance with the method outlined above is admixed with the water in an amount and for a period of time sufficient to remove contaminants from the water.

A further object of the invention is to provide an apparatus for making chlorine dioxide and an apparatus for disinfecting water or wastewater whereby the apparatus for making chlorine dioxide includes mechanisms for feeding solutions containing a hydroxy carboxylic acid, a companion acid and an alkali metal of a chlorite ion to a reaction vessel, a reaction vessel and a mechanism for withdrawing product solution from the reaction vessel. The apparatus also can include a stripping unit whereby product solution is contacted with an inert gas to produce a product gas, and an absorbing unit whereby the product gas is contacted with an aqueous medium to produce an aqueous solution of chlorine dioxide.

The apparatus for disinfecting water or wastewater includes the aforementioned apparatus for producing chlorine dioxide and a mechanism for mixing the water (or wastewater) with the aqueous solution of chlorine dioxide and a mechanism for feeding the mixture of water and sodium chloride to a contact vessel whereby the mixture is retained for a period of time to effectively reduce the level of contaminants in the water, or to render contaminants in the water harmless.

Further objects, features and advantages of the present invention will become apparent from the detailed description of the preferred embodiment which follows.

DETAILED DESCRIPTION OF THE PREFERRED EMBODIMENTS

Figure 1:
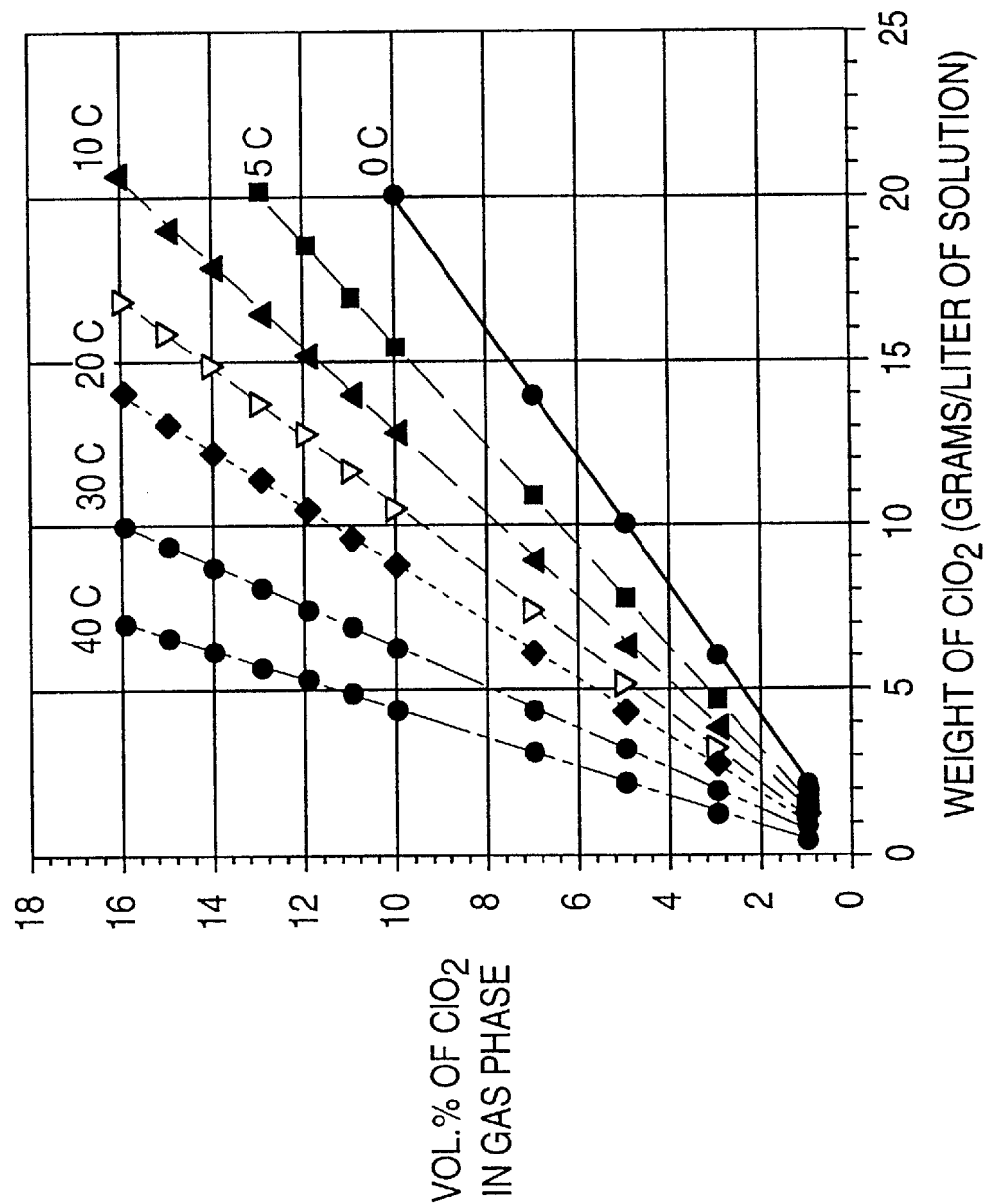
FIG. 1 is a plot of the solubility of $ClO_2$ in water as a function of temperature.
Figure 2:
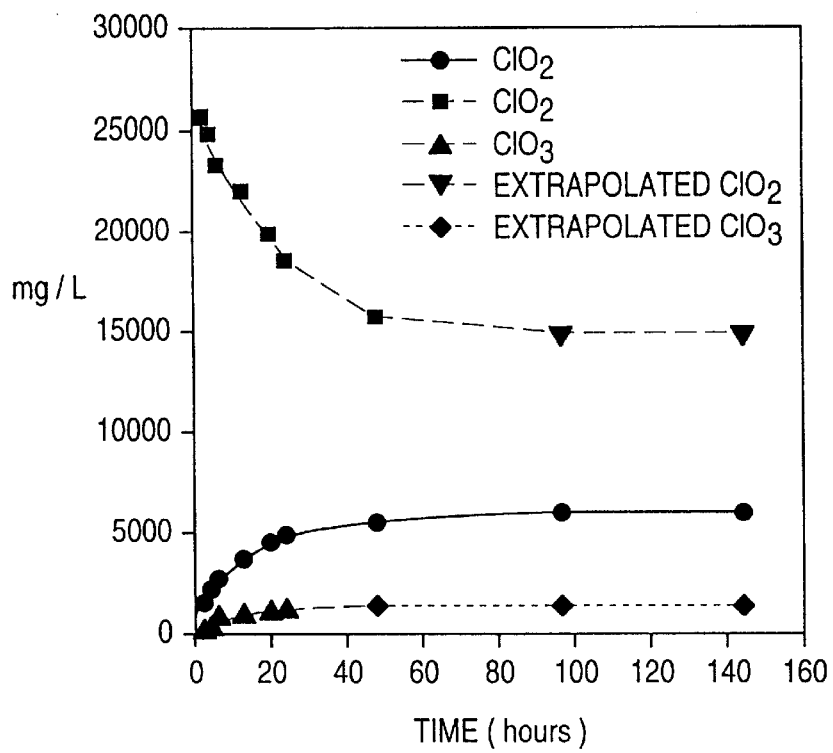
FIG. 2 is a plot of $ClO_2$, $ClO_2^-$, and $ClO_3^-$ (mg/L) versus time according to one embodiment of the present invention.
Figure 3:
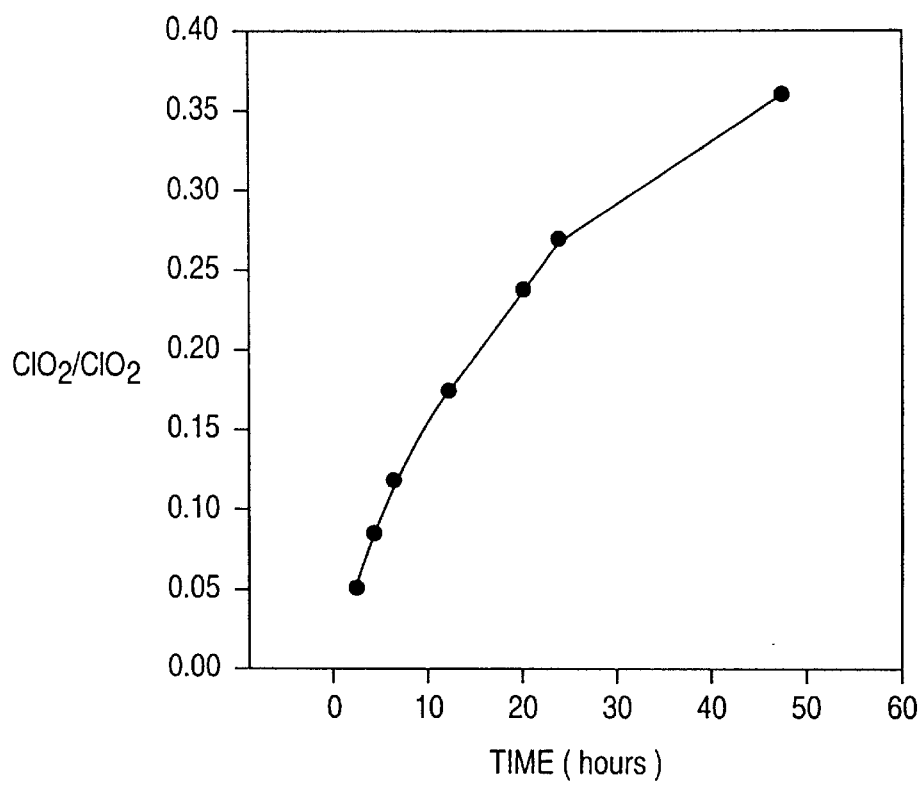
FIG. 3 is a plot of $ClO_2/ClO_2^-$ versus time according to one embodiment of the present invention.
Figure 4:
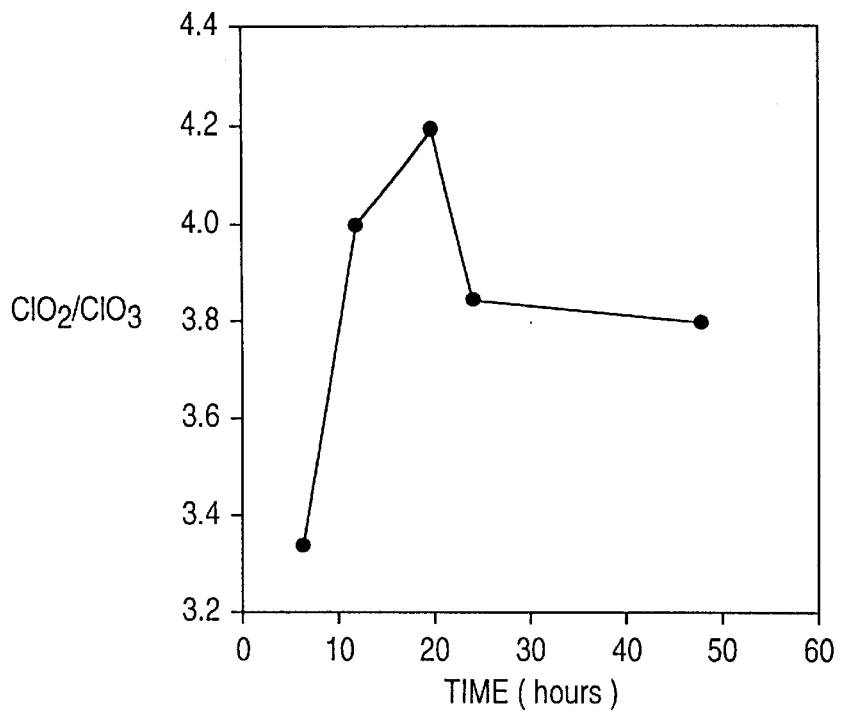
FIG. 4 is a plot of $ClO_2/ClO_3^-$ versus time according to one embodiment of the present invention.
Figure 5:
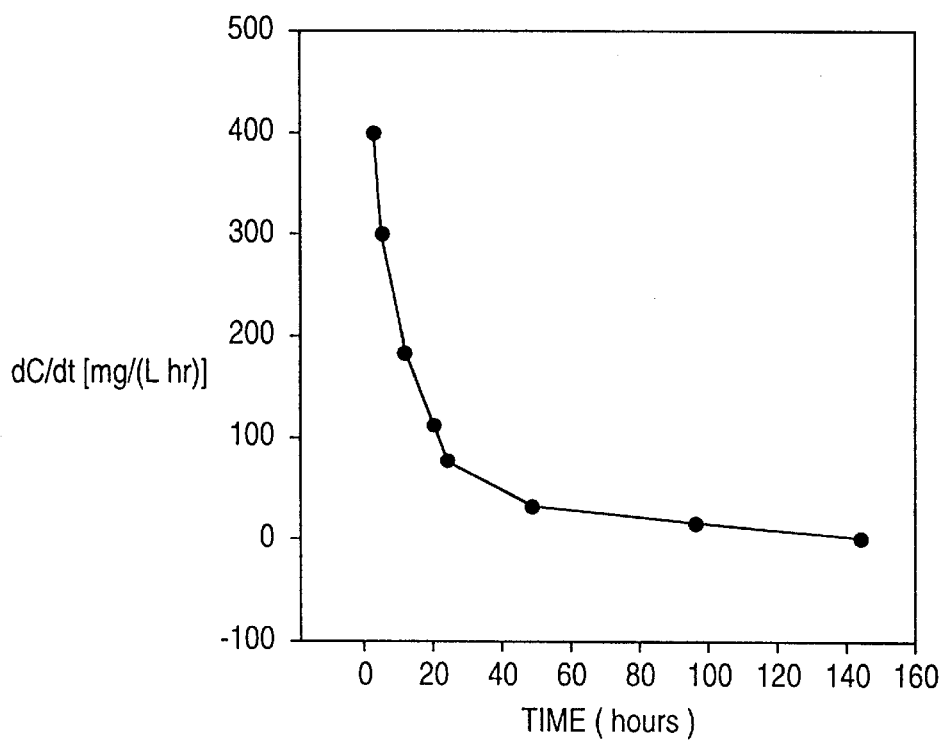
FIG. 5 is a plot of d($ClO_2$)/dt versus time according to one embodiment of the present invention.
Figure 6:
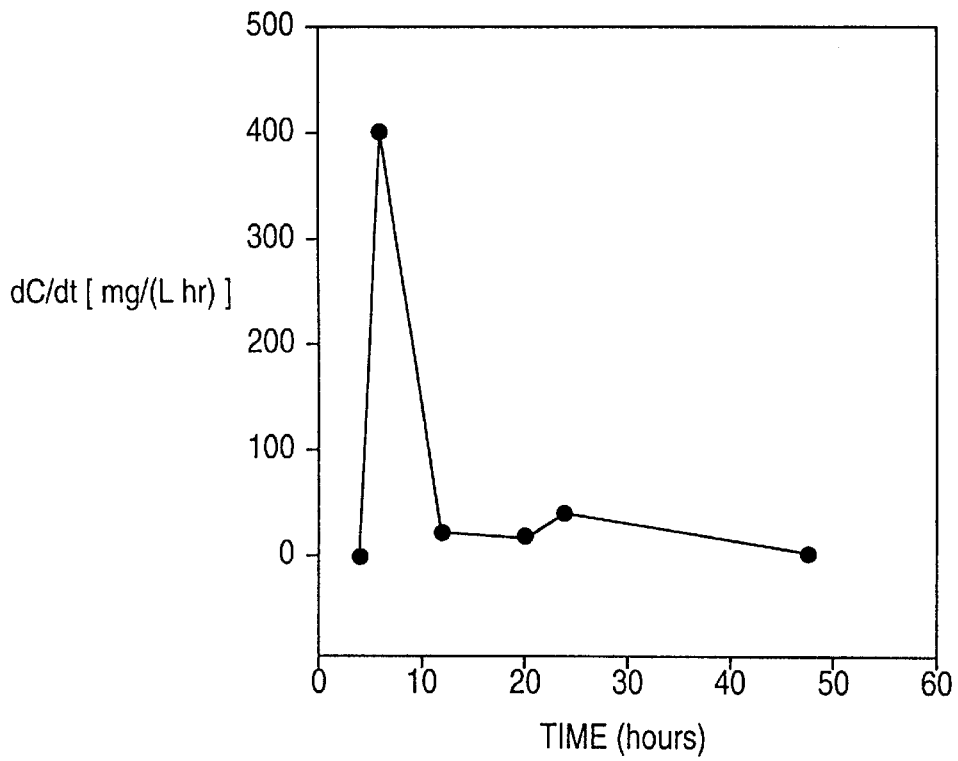
FIG. 6 is a plot of d($ClO_2^-$)/dt versus time according to one embodiment of the present invention.
Figure 7:
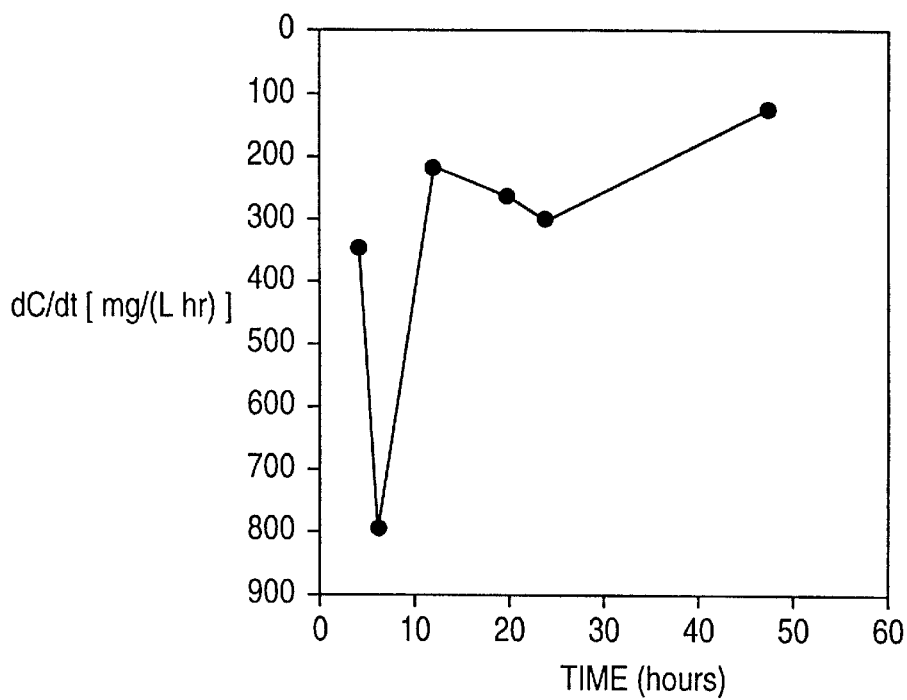
FIG. 7 is a plot of d($ClO_3^-$)/dt versus time according to one embodiment of the present invention.

Throughout this description, including the appended claims, the following terms are defined as follows:

The yield of $ClO_2$ can be defined in a number of ways:

(1) Reactants Basis:

$$\% \text{Yield}^1 = \frac{\text{Amount of } ClO_2 * 100\%}{(\text{Amount of } NaClo_2 \text{ Fed})\left(\frac{67.45}{90.45}\right)}$$

(2) Product Basis:

$$\% \text{Yield}^2 = \frac{ClO_2 * 100\%}{\left(ClO_2 + ClO_3^- + \left(\frac{67.45}{83.45}\right)ClO_3^-\right)}$$

where the superscript 1 denotes reactant basis, the superscript 2 denotes product basis and the symbol * denotes a multiplication.

The product selectivity can also be represented in a number of different ways:

(1) Desired product concentrations basis:

$$\% \text{Selectivity} = \frac{\text{Most Desired} * 100\%}{\text{Most Desired} + \text{Less or Not Desired}} =$$

$$\frac{ClO_2 * 100\%}{ClO_2 + (ClO_3^-))\left(\frac{67.45}{83.45}\right)} \quad (2)$$

Desired versus not (or less) desired:

$$\text{Selectivity Ratio} = \frac{\text{Desired}}{\text{Less Desired}} = \frac{ClO_2}{(ClO_3^-)\left(\frac{67.45}{83.45}\right)} = \frac{ClO_2}{ClO_3^-}$$

Selectivity for both main and byproducts: (3)

$$\% \text{Selectivity} =$$

$$\frac{\text{Most Desired} * 100\%}{\text{Most Desired} + \text{Less or Not Desired}} = \frac{ClO_w * 100\%}{ClO_2 + (ClO_3^-)\left(\frac{67.45}{83.45}\right)}$$

Salt Selectivity: (4)

$$\% \text{Salt Selectivity} = \frac{\text{Salt}}{\text{Most Desired}} = \frac{\text{Salt} * 100\%}{ClO_2}$$

Product Selectivity: (5)

$$\% \text{Selectivity} = \frac{[ClO_2 = NaClO_3] * 100\%}{NaClO_2 \text{ Fed}}$$

Pure Product Selectivity: (6)

$$\text{Selectivity} = \frac{ClO_2 * 100\%}{NaClO_2 \text{ Fed} * \left(\frac{67.45}{90.45}\right)}$$

Throughout this description, the expression, "substantially free of chlorous acid" and "substantially free of free chlorine" denotes a solution that contains less than about 1 wt % chlorous acid or free chlorine, preferably, less than about 0.5 wt % and most preferably, less than about 0.05 wt %, based on the total weight of the solution. Most advantageously, the expressions "substantially free of chlorous acid" and "substantially free of free chlorine" denote a solution that contains no chlorous acid or chlorine. Throughout this description, the expressions "acid gas" and "product gas" denote an inert gas that has absorbed either acid or chlorine dioxide product, respectively. Throughout this description, the expression "the companion acid does not react directly with the alkali metal salt of a chlorite ion" means that the function of the companion acid is to provide the acidity to the aqueous reaction solution and not to react with the alkali metal salt of a chlorite ion. In addition, this expression denotes a reaction whereby the alkali metal does not substantially form a salt with the companion acid, and the companion acid does not substantially react with the chlorite ions.

As described above, an aspect of the invention involves the reaction between a hydroxy carboxylic acid, a companion acid and an alkali metal salt of a chlorite ion. In one embodiment, the reaction takes place in a reaction vessel whereby (i) the pH of the reaction vessel is maintained at a value below 5, or (ii) at least a portion of the chlorine dioxide in the product solution is removed from the reaction vessel. Preferably, both steps (i) and (ii) are carried out. Throughout this description, the expression, "at least a portion," when referring to the removal of chlorine dioxide from the product solution, denotes at least about 10%, preferably, more than about 30% and even more preferably, more than about 50% of the total chlorine dioxide in the product solution. Most preferably, all of the chlorine dioxide in the product solution is removed. This expression is not intended to denote withdrawing a sample from the reaction vessel. In addition, throughout this description, the expression "at least a portion," when referring to the removal of acid from the aqueous acid solution or absorbing the acid from the acid gas into the reaction solution, denotes at least about 20%, preferably, more than about 30% and even more preferably, more than about 50% of the total acid in the aqueous acid solution. Most preferably, this expression, when referring to the removal of acid from the aqueous acid solution or absorbing the acid from the acid gas into the reaction solution, denotes all of the acid in the aqueous acid solution.

In a preferred embodiment of the invention the hydroxy carboxylic acid includes lactic acid and the companion acid is an additional organic acid such as acetic acid. In accordance with the invention, a sufficient amount of the companion acid is provided to maintain the pH of the aqueous reaction solution at $\leq 5$, preferably $\leq 4$. The present inventor found that merely mixing and reacting the respective components, i.e., hydroxy carboxylic acid, companion acid and alkali metal of a sodium chlorite ion, resulted in a significant increase in the pH of the reaction solution during the course of the reaction, even if the pH of the original reaction solution was substantially lower than 4 (see, FIG. 16). The inventor unexpectedly found that, if the pH of the reaction solution was not maintained below 5, then the reaction would proceed more slowly and produce a chlorine dioxide solution containing lower concentrations of chlorine dioxide (e.g., on the order of 2,000 to 5000 mg/l over a period of one to three days).

In another preferred embodiment, the pH can be maintained by providing a source of an inert carrier gas; flowing the carrier gas through the aqueous acid solution which includes at least one of a companion acid and hydroxy carboxylic acid. At least a portion of the acid is entrained into the inert carrier gas to provide an acid gas. The acid gas then is introduced into the aqueous reaction solution whereby the at least a portion of the acid in the acid gas is absorbed into the aqueous reaction solution.

In yet another preferred embodiment, the acid concentration is increased by reducing the amount of water used in the process. In this embodiment, advantageously more than half, and preferably about two-thirds, of the water typically employed to make up the aqueous acid solution is removed, and then this aqueous acid solution (hereinafter referred to as "concentrated acid solution") is mixed with an aqueous solution of the alkali metal salt of a chlorite ion to generate the aqueous reaction solution.

According to another preferred embodiment, the reaction temperature is maintained at a temperature within the range of from about 20° C. to about 60° C., and more preferably within the range of from about 30° C. to about 45° C. and most preferably at about 40° C. The inventors found that by carrying out the aforementioned reactions at a temperature of about 40° C., significantly higher yields of chlorine dioxide could be achieved in shorter periods of time.

In accordance with the present invention, instead of, or in addition to maintaining the pH of the reaction vessel at a value of less than 5, at least a portion of the aqueous product solution is removed from the reaction vessel either periodically or continuously during the reaction. In this embodiment, at least a portion of the chlorine dioxide present in the product solution then can be removed using methods well known to skilled artisans, for example, (i) stripping followed by absorption, (ii) a multi-stage (preferably two stage) countercurrent gas-liquid absorption mechanism or (iii) stripping followed by condensation and then subsequent absorption. In a preferred embodiment, the process further includes separating the chlorine dioxide from the aqueous reaction solution by flowing an inert carrier gas, (e.g., nitrogen or argon), through the aqueous reaction solution, wherein at least a portion of the chlorine dioxide is stripped out of the solution and is entrained in the inert gas due to the difference between the vapor pressure of the chlorine dioxide and the other reactants and reaction products in the aqueous reaction solution, to provide a product gas. This product gas then can be either directly contacted with water in an absorber, or can first be condensed and the vapor from the condenser then subjected to absorption. Those skilled in the art recognize that the stripping/ absorption, or stripping/condensation/absorption can emanate either from the reaction solution within the reaction vessel itself, or from a product solution that has been withdrawn from the reaction vessel. In addition, the skilled artisan is capable of designing suitable stripping, absorption and condensation units to provide the necessary separations in accordance with the objectives and guidelines provided herein.

Alternatively, the acid gas that has passed through the acid solution can subsequently be passed through the reaction product solution to provide a product gas, which then can be further treated as described above. For example, the chlorine dioxide present in the product gas then can absorbed in an aqueous media, preferably water, to provide an aqueous chlorine dioxide solution. In an alternative embodiment, at least a portion of the aqueous reaction product solution can first be removed from the reactor and then contacted with the inert carrier gas to provide a product gas and a stripped product solution.

Other preferred embodiments, the process includes a variety of combinations of the aforementioned embodiments. For example, the process may include: providing a hydroxy carboxylic acid that serves to temporarily transfer chlorine from and not substantially form a salt with an alkali metal of a chlorite ion that is added subsequently; providing a companion acid that will not directly react with an alkali metal salt of a chlorite ion which together with the hydroxy carboxylic acid provides an acid reaction solution; providing an alkali metal salt of a chlorite ion to create an aqueous reaction solution, wherein the hydroxy carboxylic acid and the companion acid acidify the aqueous reaction solution and reacting the components in a reaction vessel; maintaining the reaction vessel at a temperature within the range of from about 20° C. to about 60° C., preferably at a temperature within the range of from about 30° C. to about 45° C.; providing a source of an inert carrier gas; flowing the inert carrier gas through the aqueous acid reaction solution, whereby at least a portion of either the hydroxy carboxylic acid or the companion acid, or preferably at least a portion of both, vaporizes into the inert carrier gas stream to provide an acid gas; flowing the acid gas through and into intimate contact with the aqueous reaction solution in an amount sufficient to maintain the reaction solution at a pH of less than about 5, preferably less than about 4; reacting the hydroxy carboxylic acid and the chlorite ions in the reaction vessel to form a product solution comprising at least chlorine dioxide, optionally removing at least a portion of chlorine dioxide from the product solution, wherein the product solution is substantially free of chlorous acid and free chlorine. Another preferred process of the invention further includes contacting the product solution with an inert gas, preferably nitrogen, whereby at least a portion of the chlorine dioxide vaporizes into the inert gas to create a product gas; and contacting the product gas with an aqueous medium, preferably water, to separate the chlorine dioxide from the product gas and to provide an aqueous solution of chlorine dioxide.

In yet another advantageous embodiment of the invention, a process for the continuous production of chlorine dioxide is provided. The process generally is similar to the processes described above only the reactants are continuously fed to the reaction vessel and product solution is continuously withdrawn and optionally treated. The continuous production of product solution is a particularly preferred embodiment of the invention. Once formed, the product solution is continuously withdrawn and transferred to a chlorine dioxide stripping unit. An inert gas is provided to the stripping unit and contacts the product solution, e.g., in a countercurrent manner. At least a portion of the chlorine dioxide in the product solution transfers to the inert gas to provide a product gas: The product gas then can be passed, e.g., into a condenser to condense any hydroxy carboxylic or companion acid present in the saturated inert gas, thereby producing an acid solution and a chlorine dioxide-containing gas. The chlorine dioxide-containing gas can then be passed to a chlorine dioxide scrubber where it is contacted with an aqueous solution such as water to form an aqueous chlorine dioxide solution and a scrubbed inert gas stream. In a particularly preferred embodiment, the condensed hydroxy carboxylic acid or companion acid can be recycled to the acid reaction solution, and the scrubbed inert gas stream can be recycled to the chlorine dioxide stripping unit.

In still another preferred embodiment of the present invention, the product solution emanating from the reactor is fed to a multi-stage, preferably a two-stage, counter-current cascade whereby the product solution first is contacted with an inert gas in the initial stage, and then is contacted with an aqueous medium, preferably water in subsequent stages to provide an aqueous solution of chlorine dioxide.

Other procedures for removing the chlorine dioxide from the product solution, to form an aqueous chlorine dioxide solution, may be readily apparent to skilled artisans.

The present invention also encompasses methods of disinfecting water using a chlorine dioxide solution prepared in accordance with the methods described above. Water in this context denotes any water, including municipal drinking or potable water, industrial waste water, hazardous waste water, fresh water and the like. The aqueous chlorine dioxide solution is admixed with the water in an amount and for a period of time sufficient to reduce the level of contaminants from the water, or to render the contaminants harmless. Those skilled in the art are capable of adding the effective amount and determining the appropriate retention time given the concentration of chlorine dioxide in the aqueous product solution, and given the contaminant that is to be removed. For example, if fecal coliform is to be removed or reduced to an acceptable level, one can refer to generally available charts to determine the concentration of chlorine dioxide required to effect the requisite removal or reduction. By using the aqueous chlorine dioxide solution of the present invention, much higher concentrations of chlorine dioxide solutions can be prepared in much shorter periods of time, thereby enabling a more efficient water disinfectant or water treatment regimen. Due to the inherent instability of aqueous chlorine dioxide solutions, it is preferred to admix the aqueous chlorine dioxide solution with the water to be treated within 120 hours after the chlorine dioxide solution has been made, and preferably within 72 hours.

The present inventor extensively studied the reactions that take place between a hydroxy carboxylic acid, a properly selected companion acid, and an alkali metal of a chlorite ion. He discovered, quite unexpectedly, that the reaction proceeds in accordance with a reaction sequence dramatically different from the reaction mechanisms described in the prior art. Indeed, the inventor found that the hydroxy carboxylic acid serves to temporarily transfer chlorine from the alkali metal salt of a chlorite ion, instead of forming a salt therewith. The inventor further found that a properly selected companion acid could be used to maintain the pH of the reaction solution, and that it could be chosen to not interfere with the reaction between the hydroxy carboxylic acid and the alkali metal salt of a chlorite ion. The inventor further was able to devise the reaction sequence and study the mechanisms of the reactions and unexpectedly found that the empirically derived reaction rate did not accurately reflect the reaction kinetics. The inventor further discovered that the reaction rate was directly influenced by the pH of the reaction solution as well as the concentration of unreacted chlorite. The inventor also found that unexpectedly high yields of chlorine dioxide could be attained by maintaining the pH of the reaction solution less than about 5, and/or by withdrawing at least a portion of the product solution from the reactor during the reaction. Preferably, withdrawing product solution is effected continuously and reactants are fed to the reaction vessel continuously.

The reaction mechanism and kinetics involved in the production of $ClO_2$ in accordance with the present invention are as follows. The equations set forth below illustrate acetic acid as the companion acid and lactic acid as the hydroxy carboxylic acid. However, as discussed below, other companion acids and hydroxy carboxylic acids can be used.

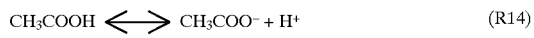
$$CH_3COOH \Longleftrightarrow CH_3COO^- + H^+ \tag{R14}$$

$$NaClO_2 \longrightarrow Na^+ + ClO_2^- \tag{R15}$$

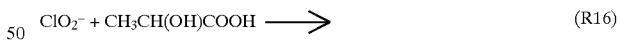
$$ClO_2^- + CH_3CH(OH)COOH \longrightarrow \tag{R16}$$

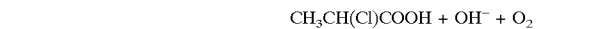
$$CH_3CH(Cl)COOH + OH^- + O_2$$

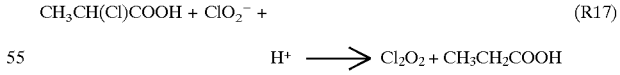
$$CH_3CH(Cl)COOH + ClO_2^- + \tag{R17}$$
$$H^+ \longrightarrow Cl_2O_2 + CH_3CH_2COOH$$

$$2Cl_2O_2 \longrightarrow 2\,ClO_2 + 2Cl^- \tag{R18}$$

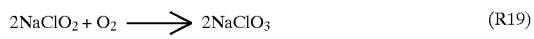
$$2NaClO_2 + O_2 \longrightarrow 2NaClO_3 \tag{R19}$$

$$H^+ + OH^- \longrightarrow H_2O \tag{R20}$$

Upon discovering the aforementioned reaction sequences, and upon recognizing the role and function of the hydroxy carboxylic acid and the companion acid, embodiments of the present invention were realized. Various preferred embodiments of the invention that involve varying certain reaction conditions (i.e., amount of water and acid used, timing of addition of acid, temperature of reaction and separation of reaction products, etc.) result in a high yield chlorine dioxide generation process and system, without the production of by-products such as free chlorine or chlorous acid. Preferred embodiments of the invention, as will be described in greater detail below, include one or more of the following: (i) maintaining the pH of the reaction solution below about 4 by adding additional companion acid either initially or incrementally during the reaction; (ii) maintaining the reaction temperature above about 40° C.; (iii) separating chlorine dioxide from the product solution by stripping and absorption either the solution in the reactor or product solution withdrawn from the reactor, or by a multi-stage countercurrent contacting method; (iv) using an acid pre-wash whereby the hydroxy carboxylic acid and the companion acid are absorbed in an inert gas; and (v) decreasing the amount of water in the reaction solution.

While the process of the present invention results in the formation of a minor amount of a sodium chlorate salt, formation of this salt actually is not entirely disadvantageous because it has weak disinfecting/oxidizing properties, and because it can be readily converted to sodium chlorite by conventional means. Those skilled in the art are capable of converting sodium chlorate to sodium chlorite. It is clear to see from the aforementioned reactions that the process does not involve the formation of free chlorine, chlorous acid or NaCl. One also can see how the companion acid is used to maintain the pH of the solution so that the hydroxy carboxylic acid can function by temporarily transferring chlorine from the alkali metal of a chlorite ion. These findings are described in more detail below. Upon discovery of the reaction mechanism involved in reacting a hydroxy carboxylic acid, a properly selected companion acid and an alkali metal salt of a chlorite ion, the inventor found that the rate of reaction was adversely affected by a dramatic increase in pH during the reaction and/or by a build up of product in the product solution. By maintaining the pH of the reaction solution at a value of less than about 5, and/or by withdrawing at least a portion of the product solution from the reaction vessel, the present inventor unexpectedly found that the rate and amount of chlorine dioxide produced could be increased by a factor of over 100, when compared to simply mixing the aforementioned reactants.

As noted above, an important feature of the present invention is that it does not involve the use of free chlorine or chlorous acid in the manufacturing process, and does not produce either of these compounds in the reaction product composition. This provides a more environmentally acceptable product. In addition, free chlorine in a water treatment system is reactive and is capable of converting hydrocarbons into chlorinated hydrocarbons which are known carcinogens. Moreover, chlorous acid is very temperature sensitive and any increases in temperature above 40° C. can be extremely dangerous. Thus, the present invention is very suitable in a water treatment system, where the water will be used for human consumption.

Due to the inherent instability of aqueous solutions of chlorine dioxide, the present method is intended to be carried out on-site with the produced chlorine dioxide product being used within a period of 120 hours, preferably within 72 hours. Most preferably, the chlorine dioxide solution so produced is contacted with water or wastewater shortly (e.g., within a few hours) after its production. Those skilled in the art recognize that an aqueous chlorine dioxide solution could remain stable longer if it is maintained under increased pressure and refrigeration, although such extraneous procedures result in significant increases in the costs of the product. The inventor further has found that the equipment needed to produce a treatment quantity of one ton/day of a 5,000 mg/l solution of $ClO_2$, by simply mixing the reactants together, is extremely large and is not amenable to producing chlorine dioxide on-site. The present invention therefore provides an efficient on-site, preferably portable, chlorine dioxide generation process and unit that is capable of providing a high concentration of chlorine dioxide in a relatively short period of time.

Any alkali metal salt of a chlorite ion can be used in accordance with the present invention so long as it follows the reactions outlined above. Usually, the alkali metal salt of a chlorite ion is selected from sodium chlorite and potassium chlorite. Preferably, sodium chlorite is used.

The present invention utilizes a relatively weak acid system of a hydroxy carboxylic acid and a companion acid that will not directly react with an alkali metal salt of a chlorite ion. Throughout this description, the expression, "relatively weak acid" denotes acids which are not recognized in the art as strong acids such as HCl, $H_2SO_4$, and the like. The organic hydroxy carboxylic acid is important in that it serves as a temporary chlorine transfer agent by producing the chlorine intermediate, $R_1CH(Cl)COOH$. While not wishing to be bound by any particular theory, this temporary transfer is believed by the present inventor to result from use of the companion acid, which permits the hydroxy carboxylic acid to perform the function without substantially forming a salt with the alkali metal. While many hydroxy carboxylic acids generally are more costly than mineral acids such as HCl and $H_2SO_4$, the corrosive nature of mineral acids and the extreme care required in handling such acids is largely avoided by the use of hydroxy carboxylic acids. Any hydroxy carboxylic acid of the formula $R_1CH(OH)COOH$ that can form a chlorine intermediate as shown above, can be used according to the present invention. $R_1$ can be any lower alkyl group which may or may not be substituted. Preferred organic hydroxy acids include butyric hydroxy acid, glycolic acid, CH2(COOH) CH2CH(OH)COOH, CH2(COOH)CH(OH)COOH, lactic dicarboxylic acid (CH2C(OH)(COOH)2, citric acid, gluconic acid, and malic acid, can be used. An especially preferred hydroxy carboxylic acid is lactic acid. Representative lists of hydroxy carboxylic acids which can be used in the method of the present invention are provided in, inter alia, U.S. Pat. No. 5,091,171.

The acidity for the process of the present invention usually is provided by an additional companion acid. Preferably, the companion acid is a relatively weak organic acid. This acid, like the hydroxy carboxylic acid is not environmentally detrimental when compared to strong mineral acids such as HCl and $H_2SO_4$. In addition, the use of an organic acid, such as acetic acid is advantageous in that large scale users of chlorine dioxide, like the paper and pulp industries, have been using $ClO_2$ in a dilute acetic acid solutions. Thus, many potential users of the chlorine dioxide produced according to the present invention already have storage and handling facilities for organic companion acids such as acetic acid.

Furthermore, the companion acid is not easily replaced by a stronger acid, such as hydrochloric acid or sulfuric acid, because when using HCl, the hydroxy carboxylic acid would not be capable of producing the required chlorine intermediate, $R_1CH(Cl)COOH$. In the case of sulfuric acid, the sulfuric acid will combine with sodium chlorite to produce sodium sulfate which is an undesirable by-product salt which must be removed from the product solution. Any organic acid of the general formula $R_2COOH$ and which does not interfere with the formation of the chlorine intermediate or does not react with the sodium chlorite to produce undesirable salts can be used according to the present invention. $R_2$ can be H or a lower alkyl which may or may not be substituted. Companion acids such as acetic acid are preferred.

In systems generally known in the art, substantial amounts of salts, usually NaCl or sodium sulfates, are produced. According to the present process, smaller amounts of NaCl and sodium chlorate are produced than the processes known in the art, and the production of sodium sulfates is avoided. In addition, while salt produced by known processes are generally troublesome, the sodium chlorate produced according to the present invention is somewhat beneficial, in that it has weak disinfecting/oxidizing capabilities. Furthermore, the sodium chlorate can be converted back into sodium chlorite by, for example, a reconstitution reaction. Those skilled in the art are capable of converting sodium chlorate to sodium chlorite.

The amount of water usually used corresponds generally to the amount of water typically present in conventional hydroxy carboxylic acid solutions and companion acid solutions. For example, hydroxy carboxylic acids such as lactic acid are commercially available as an 88% solution of lactic acid (i.e., 88% lactic acid and 12% water, by weight). Ostensibly, the amount of water typically included in the acid solution is within the range of from about 4 to about 7 times the total amount of acid, by weight, preferably, from about 5 to about 6.5, and most preferably, about 6 times. Hence, the water to acid ratio in the acid solution usually is within the range of from about 4 to about 7, and most preferably about 6. The amount of the companion acid is usually added in an amount sufficient to acidify the reaction mixture. In accordance with an embodiment of the invention, a more concentrated acid solution can be used, and can be added to the reactor either continuously, or incrementally over time. The aqueous acid solution can be concentrated by either adding additional acid or by deleting the amount of water. Preferably, the concentrated acid reaction solution contains water in an amount of from about 1.5 to 3.5 times the total amount of acid, by weight, and more preferably, about 3 times. Accordingly, to concentrate the aqueous acid solution, the water to acid ratio usually is within the range of from about 1.5 to about 3.5, and preferably about 3.

In preferred embodiments of the present invention, the process is carried out continuously whereby product solution is continuously withdrawn from the reactor. Any reactor can be used to react the aqueous acid solution and the alkali metal salt of a chlorite ion. Preferably, the reactor is selected from a continuous stirred tank reactor, a tubular reactor, and a plug flow reactor. More preferably, the reactor can be temperature controlled by placing the reactor in a water bath that can be maintained at a given temperature by external heating and cooling devices. Any mechanism for controlling the temperature of the reactor can be used with the present invention.

A tubular reactor is preferably employed in the present invention whereby the aqueous acid solution is reacted with an alkali metal salt of a chlorite ion in a tube. Generally, the tube is designed to have a length sufficient to provide enough detention time in the reactor to adequately react the ingredients given the flow rate of the reaction solution and the temperature of the water. Those skilled in the art are capable of designing a suitable tubular reactor given the objectives and guidelines presented herein. One particularly preferred reactor that can be used to make a suitable on-site aqueous chlorine dioxide generator is a temperature controlled tubular reactor containing one or more coils made of, for example, Teflon coated polyethylene tubings, whereby the coil(s) total about 150 to about 200 feet in length, whereby each coil(s) can have an internal volume of about 500 ml. The total reactor volume in this advantageous embodiment is about 1,500 ml. Those skilled in the art are capable of varying the size and shape of the reactor depending on the amount of aqueous chlorine dioxide to be produced, the flow rate of reactants, the pH of the aqueous reaction solution, the pH of the product solution and the temperature of the reactor. Those skilled in the art also are capable of modifying the temperature of the reactor.

The reaction time also can be varied in accordance with the present invention. For example, a batch reaction can take place whereby after a given period of time the reactants are withdrawn from the reactor or a portion of the reactants are withdrawn periodically. In the case of a continuous reactor, the flow rates of the reaction solutions (i.e., the acid reaction solution and the solution containing the alkali metal salt of a chlorite ion) can be varied as well as the rate at which the product solution is withdrawn from the reactor. Ideally, the faster the reaction, the more product produced in a given period. Preferably, the reaction time is within the range of from about 15 minutes to about 48 hours, more preferably, less than 24 hours, and most preferably, in the case of using a continuous process, the residence time in the reactor can be about 45 minutes, and even as low as about 20 minutes.

The apparatus of the present invention generally includes the appropriate devices and mechanisms for carrying out the methods described above. The apparatus typically includes an acid storage tank and a chlorite storage tank whereby an aqueous acid solution is retained in the acid storage tank, (the aqueous acid solution being the same aqueous acid solution described above), and a solution of an alkali metal salt of a chlorite ion are stored in the chlorite storage tank. Mechanisms are provided which can both feed the appropriate ingredients to the storage tanks and to withdraw solutions therefrom. Preferably, these mechanisms include pumps and feed lines sufficient to withstand the flow rate of aqueous acid solution and solutions of alkali metal salts of a chlorite ion. Those skilled in the art can readily determine an adequate size for the respective storage tanks, feed lines and pumps to effect the requisite feed rates of reactant solutions (i.e., aqueous acid solution and solution of an alkali metal salt of a chlorite ion). One particularly preferred embodiment of the invention includes two pumps (one for the aqueous acid solution and the other for the solution of the alkali metal salt of a chlorite ion) that operate at about the same level, for example at about 20 to about 30 cc/min.

The apparatus further includes a mechanism for mixing the aqueous acid solution and the solution containing the alkali metal salt of a chlorite ion to provide an aqueous reaction solution. Any mechanism that adequately mixes the aforementioned solutions can be used, including conventional tees or other joints that combine two streams into one, baffled piping or the use of a stirred vessel. A particular preferred mechanism for mixing includes a tee, followed by a tubing packed with glass beads. The aqueous reaction solution, upon mixing, then can be fed to a reaction vessel.

Any reactor that is capable of effecting the reaction between the aqueous acid solution and the alkali metal salt of a chlorite ion can be used including, continuous stirred reactors, simple tanks, plug-flow reactors and tubular reactors. A tubular reactor is particularly preferred.

Advantageously, the reactor is temperature controlled by any mechanism capable of maintaining the reaction temperature at a given value. Those skilled in the art are familiar with various temperature controlled reactors and can design a suitable reactor given the objectives and guidelines provided herein. In addition, reference can be made to any available reference manual such as Perry & Chilton's CHEMICAL ENGINEERS' HANDBOOK, 5th Ed., McGraw-Hill, Inc., (1973), the disclosure of which is incorporated by reference herein in its entirety. Preferably, the reactor is a tubular reactor of about 150 to 200 feet in length in a water bath, whereby the tubular reactor is coiled within the water bath. In addition, the reactor preferably is maintained at a temperature of about 40° C. and provides a residence time of about 45 minutes.

A product solution is withdrawn from the reactor by any mechanism capable of withdrawing an aqueous solution from a reactor. Preferably, the reaction is carried out continuously, and product solution is continuously withdrawn from the reactor. After exiting the reactor, the product solution can either be used directly, or it can be treated further by stripping and absorption. For example, the product solution can be fed to a stripper which includes a gas-liquid inlet line, a liquid outlet and a gas outlet. Preferably, the product solution is contacted with a gas (such as nitrogen, argon or air) and fed to the stripper, usually at the bottom where it is sparged with the liquid present in the stripper. The liquid level in the stripper can be maintained by setting the level of the liquid outlet line. Those skilled in the art are capable of designing a suitable stripper given the objectives and guidelines presented herein.

Any mechanism capable of withdrawing the stripped product solution and product gas from the stripper can be used in accordance with the present invention. Product solution preferably is withdrawn from the stripper via a pump, whereby the pump is operated at a level that is compatible with the feed rate of the combined product solution and gas, which is fed to the stripper via the gas-liquid feed line. In one embodiment, a pump is employed to withdraw the stripped product solution which effects a flow rate of about 50 to about 60 cc/min, and the gas is mixed with the product solution at a flow rate of about 500 to about 1,500 cc/min, preferably at about 1,000 cc/min.

The stripped product solution then can be sent to a storage tank, or recycled to the reactor. The product gas that is removed from the stripper then can be fed to an absorber. Alternatively, the product gas first can be fed to a condenser to condense any unreacted acid that may be present in the product gas. Any mechanism for condensing unreacted acid can be used in accordance with the invention, and the skilled artisan is capable of designing a suitable condenser to effect the required separation. If a condenser is used, the chlorine dioxide-containing gas leaving the condenser is fed to an absorber. If a condenser is not employed, the product gas is fed directly to the absorber.

The absorber preferably includes a gas-liquid inlet line, a gas outlet line and a liquid outlet line. Before entering the absorber, water is contacted with the product gas and then fed to absorber, usually at the bottom where it is sparged with the liquid present in the absorber. As with the stripper, the liquid level in the absorber can be maintained by setting the level of the liquid outlet line. Any mechanism capable of withdrawing liquid from the absorber can be used to withdraw the liquid from the absorber and any mechanism capable of feeding water to the product gas can be used. Preferably, pumps are employed to transfer the respective aqueous solutions, and more preferably, these pumps are operated at the same rate. In this embodiment, the absorber should be charged with the appropriate amount of aqueous medium prior to operation. In a particularly preferred embodiment of the invention, the pumps that feed the water to the product gas (or chlorine dioxide-containing gas if a condenser is used) and withdraw the aqueous chlorine dioxide solution from the absorber operate at about 200 to about 225 cc/min.

Other embodiments of the apparatus of the invention that will be described in more detail below by reference to the figures include an acid pre-wash. In this embodiment, a gas (preferably nitrogen or argon) contacts the aqueous acid solution prior to its mixture with the solution containing the alkali metal salt of a chlorite ion to provide an acid gas. The acid gas then is bubbled through the reactor whereby the acid entrained in the gas is absorbed in the aqueous reaction solution. The apparatus of the invention therefore would include a stripper after the acid storage tank, or the acid storage tank would have an inlet gas feed line and an outlet gas feed line. Likewise, the reactor would be equipped with a mechanism capable of accepting the acid gas, and venting the spent gas. Those skilled in the art are capable of designing strippers, storage tanks and reactors capable of carrying out the aforementioned method using the objectives and guidelines provided herein.

In an additional embodiment of the invention, the apparatus may include, in place of the stripper, optional condenser and absorber, a multi-stage countercurrent contactor. Preferably, a two-stage countercurrent contactor is used whereby product solution emanating from the reactor is contacted with gas (nitrogen, argon or air) in a first stage to provide a stripped product solution and a product gas. The stripped product solution then can be sent to storage and/or recycled to the reactor. The product gas is fed to the second contactor whereby it is contacted in a countercurrent manner with an aqueous medium such as water to provide an aqueous chlorine dioxide solution and gas (nitrogen, argon or air).

The invention further includes methods and apparatus for treating water or wastewater whereby the aqueous chlorine dioxide solution is contacted with the water to be treated in a contact vessel. Advantageously, the contact vessel is sealed and operated at atmospheric pressure. The contact vessel may be operated at less than atmospheric pressure when the water to be treated and the aqueous chlorine dioxide solution are fed to the bottom of the contact vessel and the treated water is removed from the upper portion of the contact vessel.

Any contact vessel capable of effecting contact between the water to be treated and the aqueous chlorine dioxide solution can be used in the present invention. Those skilled in the art recognize that the contact time in the contact vessel may vary depending on the particular contaminant that must be removed and/or reduced. In accordance with the method, an operator determines the concentration of the chlorine dioxide in the aqueous chlorine dioxide solution and based on that value, determines the contact time to effect the required purification. For example, if the water to be treated contains about 1,000 CFU/100 ml of fecal coliform, and it must be reduced to a value of less than about 5 CFU/100 ml to meet the requisite safety criteria for that particular area, then the operator can ascertain the contact time by referring to readily available charts. The requisite flow rates of water to be treated and aqueous chlorine dioxide solution then can be adjusted so that, depending on the size of the contact vessel, the requisite contact time is achieved. Typically, the chlorine dioxide solution will remain in contact with the water to be treated for a period of time greater than 10 minutes.

The contact time usually is represented as a CT value, which denotes the contact time multiplied by the chlorine dioxide concentration. These CT values, or standards, are published, for example, in the 1991 GUIDANCE MANUAL FOR COMPLIANCE WITH THE FILTRATION AND DISINFECTION REQUIREMENTS FOR PUBLIC WATER SYSTEMS USING SURFACE WATER SOURCES, Denver, Colo., *American Water Works Association*. Hence, by knowing the degree of purification needed, and the concentration of the chlorine dioxide, the contact time in the contact vessel can be readily ascertained by those skilled in the art. In addition, those skilled in the art are capable of designing a suitable contact vessel using the objectives and guidelines provided herein.

A comparison between simply mixing a companion acid, a hydroxy carboxylic acid and an alkali metal salt of a chlorite ion together and other known processes for producing chlorine dioxide are shown in Table 1. As Table 1 indicates, simply reacting the ingredients, although requiring milder conditions and producing fewer undesirable by-products, still had an unacceptably slow reaction rate and therefore produced a solution having a low concentration of chlorine dioxide.

TABLE 1

|  | Process 1 | Process 2 | Process 3 | Simple Mixing* |
|---|---|---|---|---|
| Use of $NaClO_2$ | 1.25 | 1 | 1 | 1 |
| Use of $Cl_2$ | 0 | 1 | 0 | 0 |
| Use of NaClO | 0 | 0 | 0.5 | 0 |
| Use of HCl or $H_2SO_4$ | 1 | 0 | 0.5 | 0 |
| Use of Lactic Acid | 0 | 0 | 0 | 0.5 |
| Use of Acetic Acid | 0 | 0 | 0 | 0.8 |
| Free chlorine in the Reactor | none | yes | none | none |
| HCl in the Reactor | yes | yes | yes | minimal or none |
| NaCl Formation (Salt) | yes | yes | yes | minimal or none |
| HOCl Formation | none | yes | yes | none |
| $ClO_3$ formation | yes | yes | yes | yes |
| Corrosivity | most severe | severe | severe | less severe |
| Less Desirable Sodium Products | most | high | high | less |
| Selectivity to $ClO_2$ | comparable | comparable | comparable | comparable |
| Heat of reaction | highest | high | mild | low |
| Severity of Reaction Conditions | Very Severe | Severe | Severe | Mild |
| Reaction Rate | Relatively Fast | Modest | Modest | Slow |
| Continuous Operation | Possible | Possible | Possible | Possible |
| Single/Double Stage | Single | Double | Double | Single |

*Simple mixing denotes mixing lactic and acetic acid together and then reacting them with an aqueous solution of sodium chlorite.

In an effort to fully understand the reaction kinetics and mechanisms involved in the production of chlorine dioxide, a simple reaction was carried out using simple mixing of the reactants in a storage tank. A storage tank was filled about three quarters full with make-up water. The pH of the make-up water in the storage tank was adjusted to a pH of 2.8–3.5 with acetic acid. Then, lactic acid was added to the tank and mixed well. Sodium chlorite then was added to the tank and mixed well. The tank was then mixed at atmospheric pressure and ambient temperature and was sampled at the times shown in Table 2. Within one day, the tank contained about 5000 mg/l of chlorine dioxide, and could have been used as a disinfectant/oxidant/taste and odor removal agent.

As can be seen from Table 2, it took about 24 hours to achieve an aqueous chlorine dioxide solution containing 5,000 mg/l, and four (4) days to produce an aqueous chlorine dioxide solution containing 6,300 mg/l. The rate data for this simple mixing test is shown in Table 2. The selectivity of the $ClO_2$ is shown in Table 3. The product ratios and differential results are shown in Table 4. By using these data, the reaction rate for the simple reaction could be determined and correlated with reaction rate formulae.

TABLE 2

| | | | Rate Data | | | |
|---|---|---|---|---|---|---|
| Time (hr) | $ClO_2$ (mg/L) | $ClO_2^-$ (mg/L) | $ClO_3^-$ (mg/L) | Yield[1] (%) | Yield[2] (%) | Cl Accountability (mol/L) |
| 2 | 1300 | 25500 | | 0.0684 | 0.0485 | 0.397 |
| 4 | 210 | 24800 | | 0.1420 | 0.0781 | 0.398 |
| 6 | 2700 | 23200 | 809 | 0.1104 | 0.1017 | 0.391 |
| 12 | 3800 | 21900 | 951 | 0.1998 | 0.1436 | 0.389 |
| 20 | 4700 | 19800 | 1120 | 0.2472 | 0.1850 | 0.373 |
| 24 | 5000 | 18600 | 1300 | 0.2629 | 0.2028 | 0.361 |
| 48 | 5700 | 15800 | 1500 | 0.2998 | 0.2510 | 0.332 |
| 96 | 6300 | | | | | |

TABLE 3

| | Selectivity of $ClO_2$ | |
|---|---|---|
| Time (hr) | Selectivity (%) | Selectivity (ratio) |
| 2 | 100.00 | — |
| 4 | 100.00 | — |
| 6 | 80.50 | 4.13 |
| 12 | 83.18 | 4.94 |
| 20 | 83.85 | 5.19 |
| 24 | 82.63 | 4.76 |
| 48 | 82.46 | 4.70 |

TABLE 4

Product Ratios and Differential Results

| Time (hr) | $ClO_2/ClO_2^-$ | $ClO_2/ClO_3^-$ | $d(ClO_2)/dt$ (mg/L hr) | $d(ClO_2^-)/dt$ (mg/L hr) | $d(ClO_3^-)/dt$ (mg/L hr) |
|---|---|---|---|---|---|
| 2 | 0.05098 | | | −350.00 | |
| 4 | 0.08467 | | 400 | −800.00 | 0 |
| 6 | 0.11637 | 3.337 | 300 | −267.67 | 404.5 |
| 12 | 0.17351 | 3.995 | 183 | −262.50 | 23.7 |
| 20 | 0.23737 | 4.196 | 113 | −300.00 | 21.1 |
| 24 | 0.26881 | 3.846 | 75 | −116.66 | 45.0 |
| 48 | 0.36075 | 3.800 | 29.2 | | 8.3 |

From the product ratios and differential results set forth in Table 4, the graphs set forth in FIGS. 2–7 were constructed and used to correlate with mathematical reaction rate equations described in more detail below.

An equilibrium reaction rate for the simple mixing test was modeled using the following reaction rate:

$$-r_A = \frac{dC_A}{dt} = k(C_A - C_{A,eq})^\alpha$$

where $r^A$=reaction rate for $ClO_2^-$;

k is the reaction rate content;

$C_2$ is the concentration of $ClO_2^-$;

$C_{A,\,eq}$ is the equilibrium concentration of $ClO_2^-$; and $\alpha$ is the psuedo power.

Using the integral method of analysis, a pseudo-power law rate constant was calculated. By integrating the equation with limits of $C_{AO}$ (initial concentration of $ClO_2^-$) to $C_A$ the following equation was obtained:

$$\ln\left(\frac{C_A - C_{A,eq}}{C_{AO} - C_{A,eq}}\right) = k't$$

where $k' = \frac{k}{\alpha}$, the pseudo-rate constant

Figure 8:
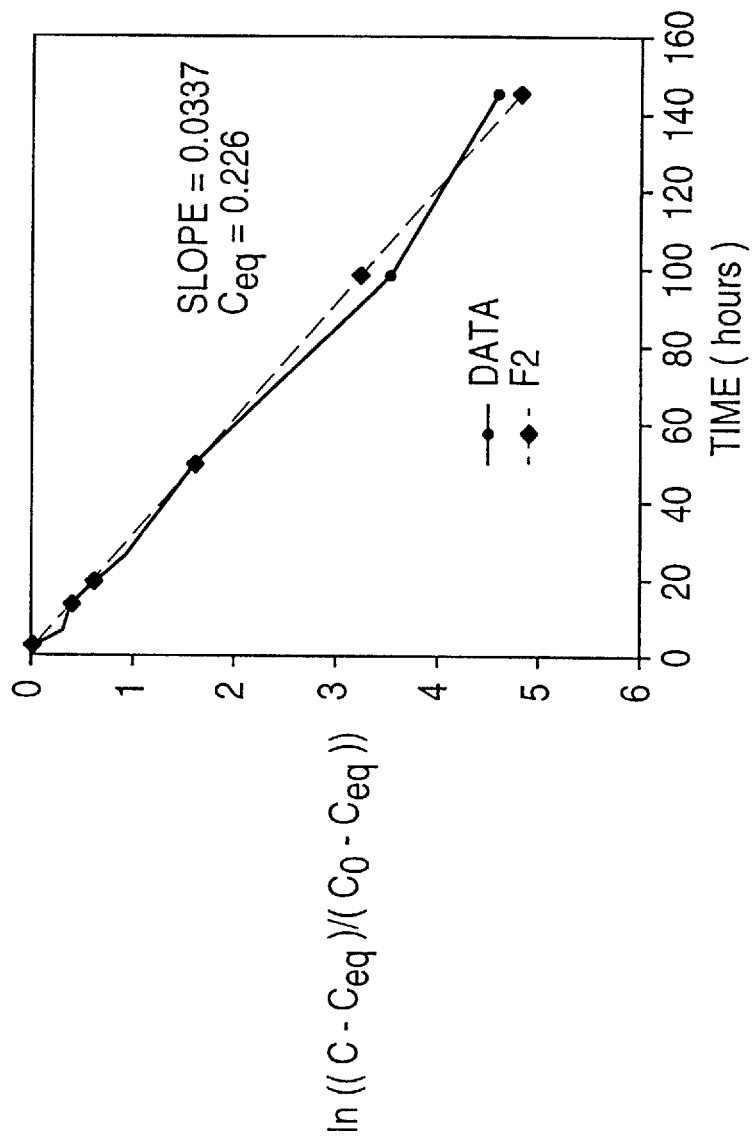
FIG. 8 is an integral plot of In ($C\text{-}_{(eq)}/(C_0\text{-}_{(eq)})$) versus time.

To plot this equation, the values Of $C_{AO}$, and of $C_{A,\,eq}$ for $ClO_2^-$ needed to be calculated. $C_{AO}$ was calculated from the data to be 0.397 mol/L (26,800 mg/L). The value Of $C_{A,\,eq}$ was extrapolated from the data to be 0.225 mol/L (15,200 mg/L). The integral plot of the data and the resulting regression are shown in FIG. 8. The value obtained for k' was −00.03366.

Figure 9:
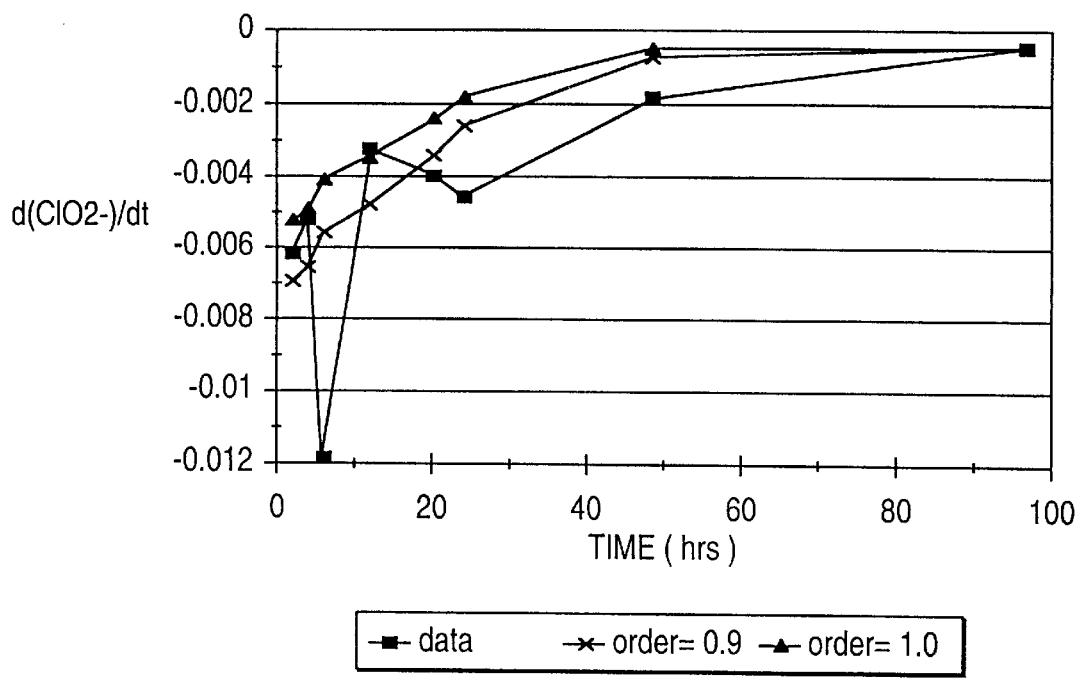
FIG. 9 is a differential plot of $ClO_2^-$ versus time for experimental data, predicted 1st order and predicted 0.9 order.

To calculate the actual rate constant and reaction order, a differential plot was used. In FIG. 9, dC/dt for the $ClO_2^-$(i.e., how much $ClO_2^-$ was consumed per unit time) was calculated from the data was compared with that obtained from the rate equation. Using k=$\alpha$(−0.03366), the value of $\alpha$ was adjusted until the best fit was seen. The resulting order was found to be 0.9 and the corresponding rate constant was about −0.0374. The rate equation therefore was believed to be best represented by:

$$-r_A = -0.0374(C-0.225)^{0.9}.$$

Figure 10:
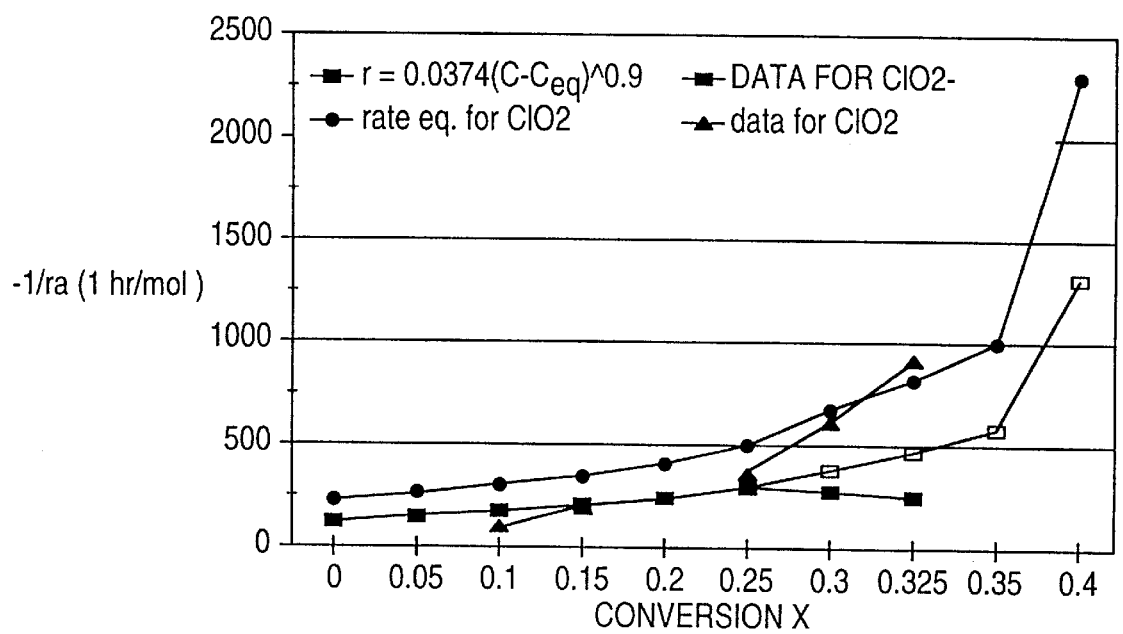
FIG. 10 is a differential plot of chlorine dioxide versus time.
Figure 11:
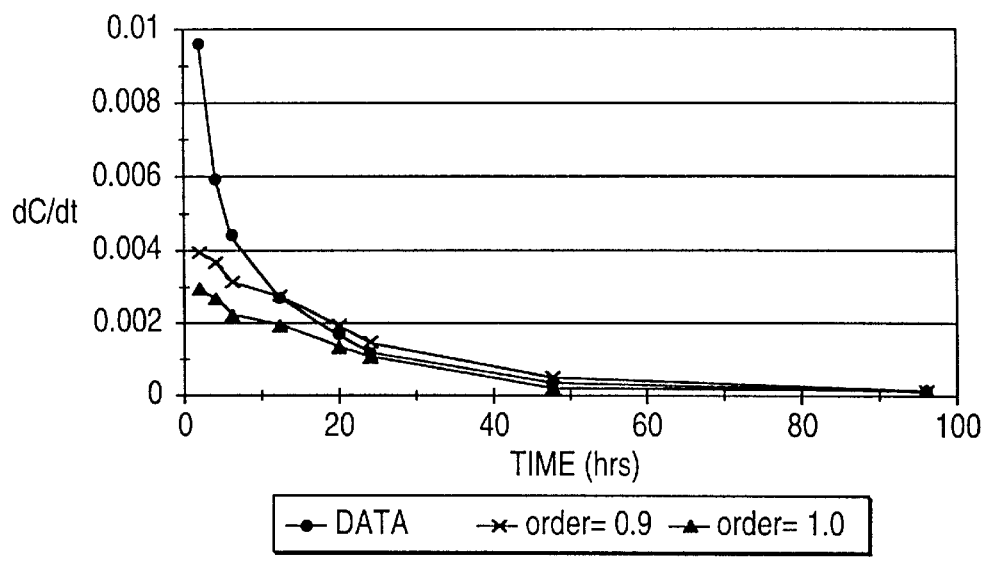
FIG. 11 is a differential plot of $ClO_2$ versus time for experimental data, predicted first order and predicted 0.9 order.

Both the integral plot and differential plot shown were for the reaction of $ClO_2^-$. However, as shown in the data for the simple mixing tests, the conversion of $ClO_2^-$ to $ClO_2$ was not on a 1:1 basis, and the final ratio based on the material balance was about 1:0.573. The factor 0.573 was then applied in the amount of $ClO_2^-$ reacted according to the above rate equation to determine the amount of $ClO_2$ produced, as shown below. The resulting differential and concentration plots for $ClO_2$ production are shown in FIGS. 10 and 11.

The term $r_B$ represents the reaction rate constant for $ClO_2$, and was calculated according to the following equation:

$$r_B = 0.573\, k(C-C_{eq})^\alpha$$

Figure 12:
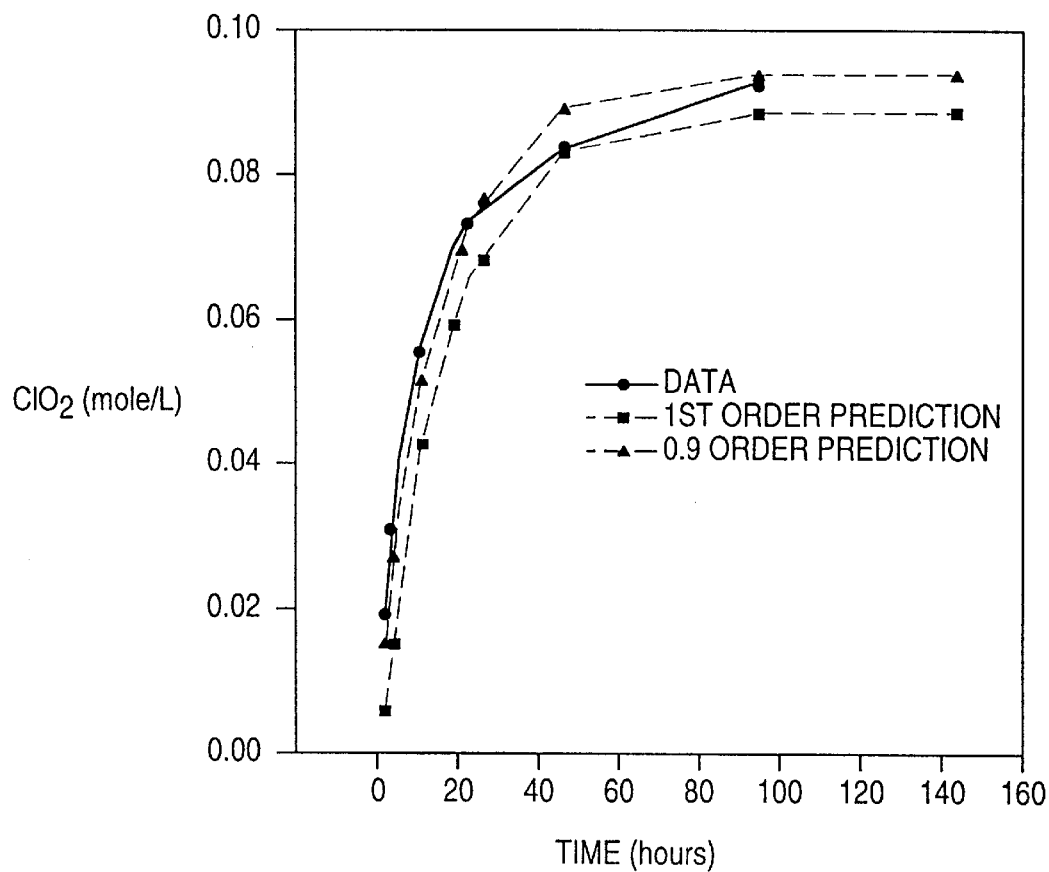
FIG. 12 is plot of chlorine dioxide concentration versus time for experimental data, 1st order predicted data and 0.9 order predicted data.

FIG. 12 demonstrates that the resulting concentrations from the rate expression were close to the data. The values in the differential plot of FIG. 11, however, underestimated the reaction rate at early time intervals. While not intending to be bound by any theory, the inventor believed that this occurred because the ratio of reacted $ClO_2^-:ClO_2$ for the first few data points was close to 1:1 and then changed throughout the reaction.

Figure 13:
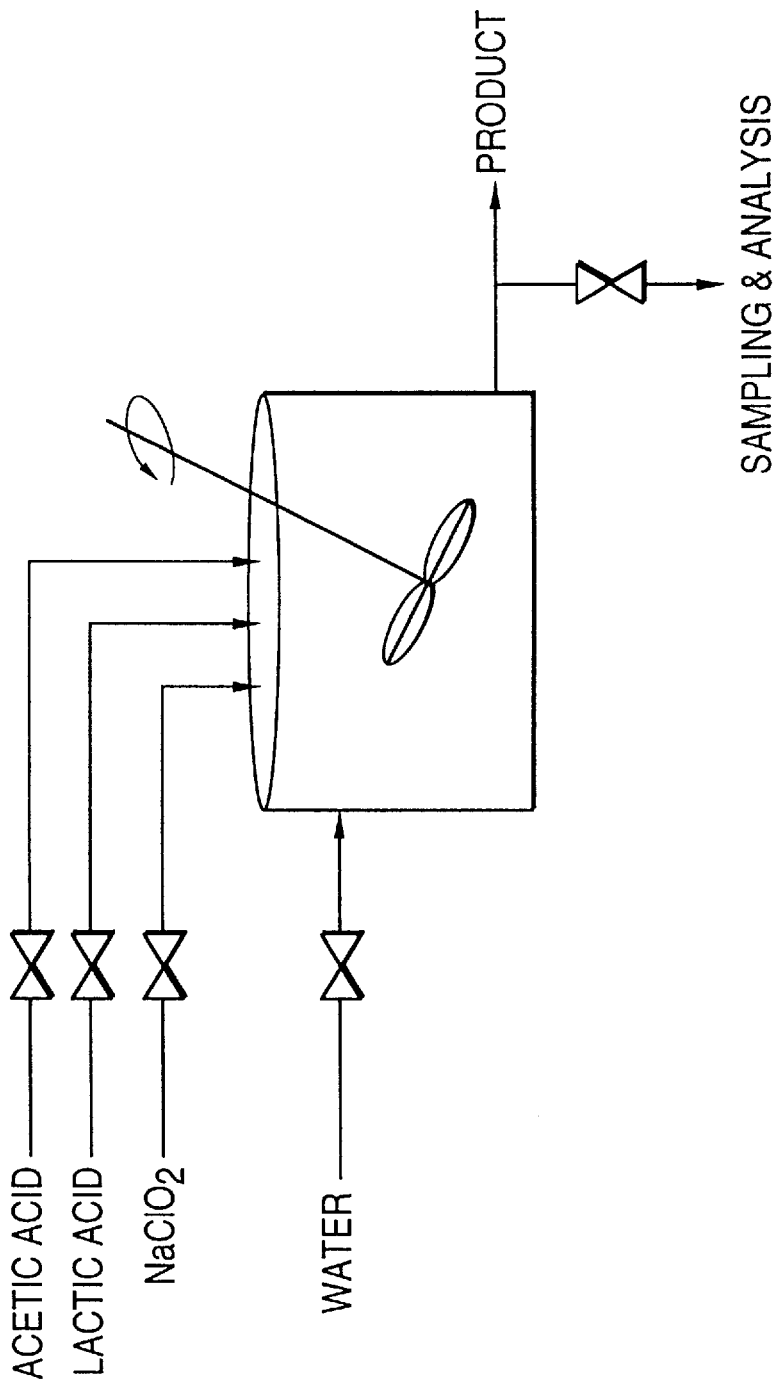
FIG. 13 is a schematic reactor diagram according to one embodiment of the present invention.
Figure 14:
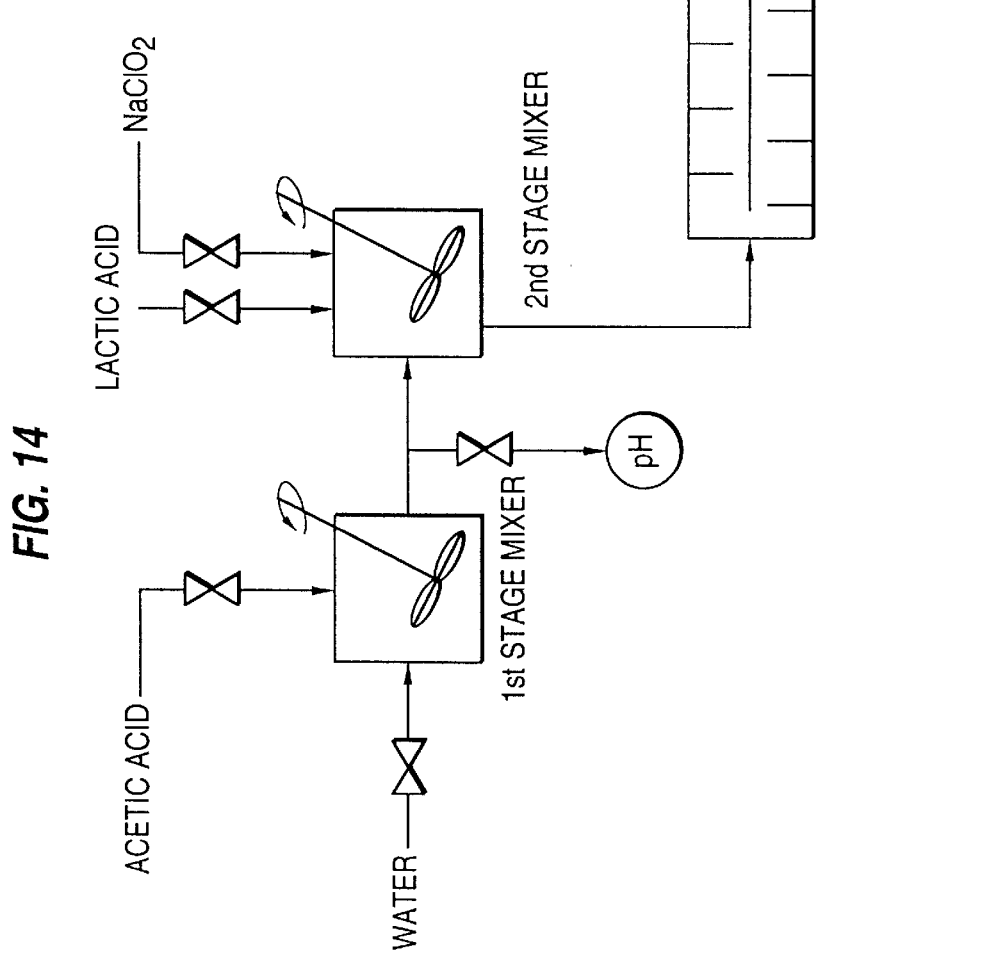
FIG. 14 is a schematic reactor diagram according to one embodiment of the present invention.
Figure 15:
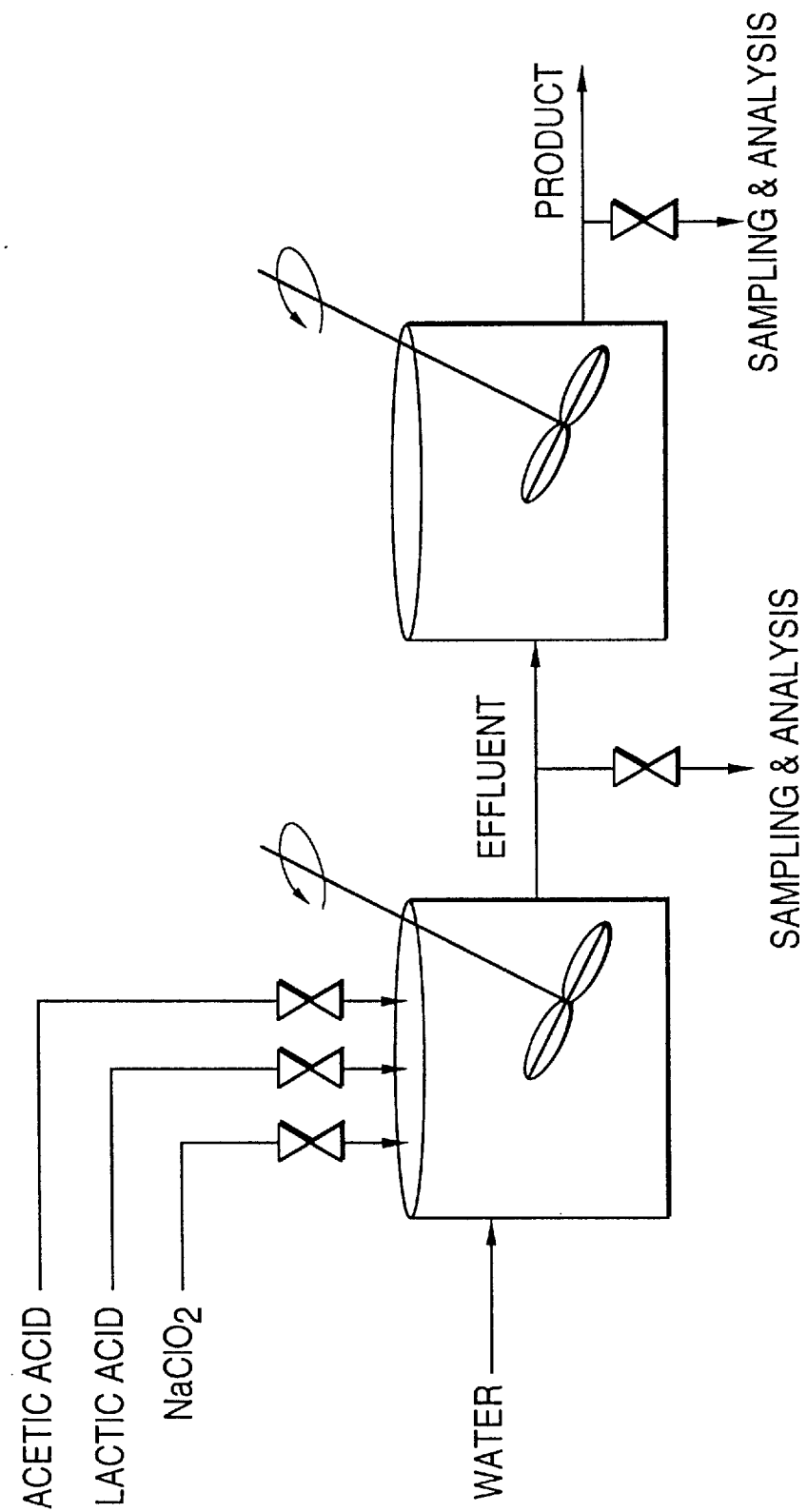
FIG. 15 is a schematic reactor diagram according to one embodiment of the present invention.

Based on the reaction data and findings above, 3 reactor configurations, a continuous stirred reactor (CSTR), a plug flow reaction (PFR) and 2 CSTR's in series were designed to have the capacity to produce one ton of an aqueous solution containing 5000 mg/L of $ClO_2$ in one day. Schematics of these reactor systems are shown in FIGS. 13, 14, and 15. The sizing necessary to achieve such a concentration can be shown below.

TABLE 5a

Reactor sizing for single CSTR

| Reactor Size (gal) | Feed Rate L/hr reaction solution | Product Rate ton/day soln |
|---|---|---|
| 593 | 37.9 | 1.000 |
| 25 | 1.6 | 0.042 |
| 50 | 3.2 | 0.084 |
| 100 | 6.4 | 0.169 |
| 200 | 12.8 | 0.337 |
| 300 | 19.2 | 0.506 |
| 400 | 25.5 | 0.675 |
| 600 | 38.3 | 1.012 |
| 800 | 51.1 | 1.349 |
| 1000 | 63.9 | 1.686 |

TABLE 5b

Reactor sizing for two CSTR's in series

| Reactor Size (gal) each | Reed Rate L/hr reaction solution | Product Rate ton/day soln |
|---|---|---|
| 204 | 37.8 | 0.999 |
| 25 | 4.6 | 0.122 |
| 50 | 9.3 | 0.245 |
| 100 | 18.5 | 9.490 |
| 200 | 37.1 | 0.980 |
| 300 | 55.6 | 1.469 |
| 400 | 74.2 | 1.959 |
| 500 | 92.7 | 2.449 |

TABLE 5c

Reactor sizing for a single plug flow reactor

| Reactor Size (gal) | Feed Rate L/hr reaction solution | Product Rate ton/day soln |
|---|---|---|
| 292 | 37.8 | 0.999 |
| 25 | 3.2 | 0.086 |
| 50 | 6.5 | 0.171 |
| 100 | 13.0 | 0.342 |

TABLE 5c-continued

Reactor sizing for a single plug flow reactor

| Reactor Size (gal) | Feed Rate L/hr reaction solution | Product Rate ton/day soln |
|---|---|---|
| 200 | 25.9 | 0.684 |
| 300 | 38.9 | 1.0266 |
| 400 | 51.8 | 1.368 |
| 500 | 64.8 | 1.711 |

As can be seen from the aforementioned tables, the reactor sizes required to produce one ton of an aqueous solution containing 5,000 mg/l of chlorine dioxide are quite large. Significantly reducing the time for the reaction and significantly increasing the concentration of chlorine dioxide, as the present inventor has done, will result in a dramatic decrease in reactor sizing thereby enabling a portable on-site aqueous chlorine dioxide generation system.

Understanding the reaction kinetics of the simple mixing test described above permitted the inventor to devise the reaction sequence (equations R14–R20), and to find, quite unexpectedly, that not only was the reaction sequence dramatically different from the sequences reported in the prior art, but also that a nearly 100 fold increase in chlorine dioxide production could be achieved by maintaining the pH of the reaction solution to a value less than about 5, and by withdrawing at least a portion of the product solution during the reaction.

The present invention now will be explained in more detail by reference to the non-limiting examples that follow.

EXAMPLE 1

The ingredients listed in Table 6 below were fed to a continuous stirred batch reactor at ambient temperature and pressure, and were reacted for a period of time, whereby samples were taken after six hours.

TABLE 6

| 3.06 g | $NaClO_2$ |
|---|---|
| 2 ml | Lactic Acid |
| 10.4 ml | Acetic Acid |

$NaClO_2$ is dissolved in 10 ml water
Acids are placed in 70 ml water
Covered

| pH | 2.9 |
|---|---|
| Volume | 92 ml |
| Sample Time | 6 hrs |
| $ClO_2$ | 3,853 mg/L |
|  | 354 mg |
| $ClO_2^-$ | 33,333 mg/L |
|  | 3,067 mg |

In accordance with this embodiment, approximately 3,853 mg/L of $ClO_2$ was produced over a period of only six hours.

EXAMPLE 2

As demonstrated in the above reaction equations (R14–R20), and as discovered by the present inventor, maintaining the acidity of the reaction solution plays an important role in providing an aqueous solution containing a high concentration of chlorine dioxide. This is supported by the trends displayed in FIGS. 16 and 21. This example therefore will study the effects of the pH on the production of chlorine dioxide, as well as the effects of adding more concentrated acid solutions either initially or incrementally.

Figure 16:
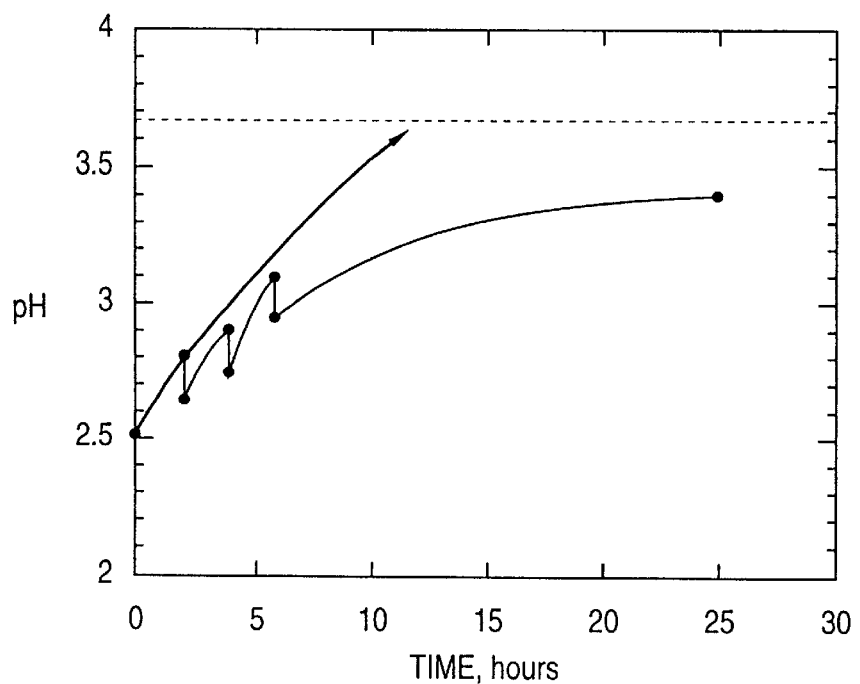
FIG. 16 is a plot of pH versus time according to one embodiment of the present invention.
Figure 21:
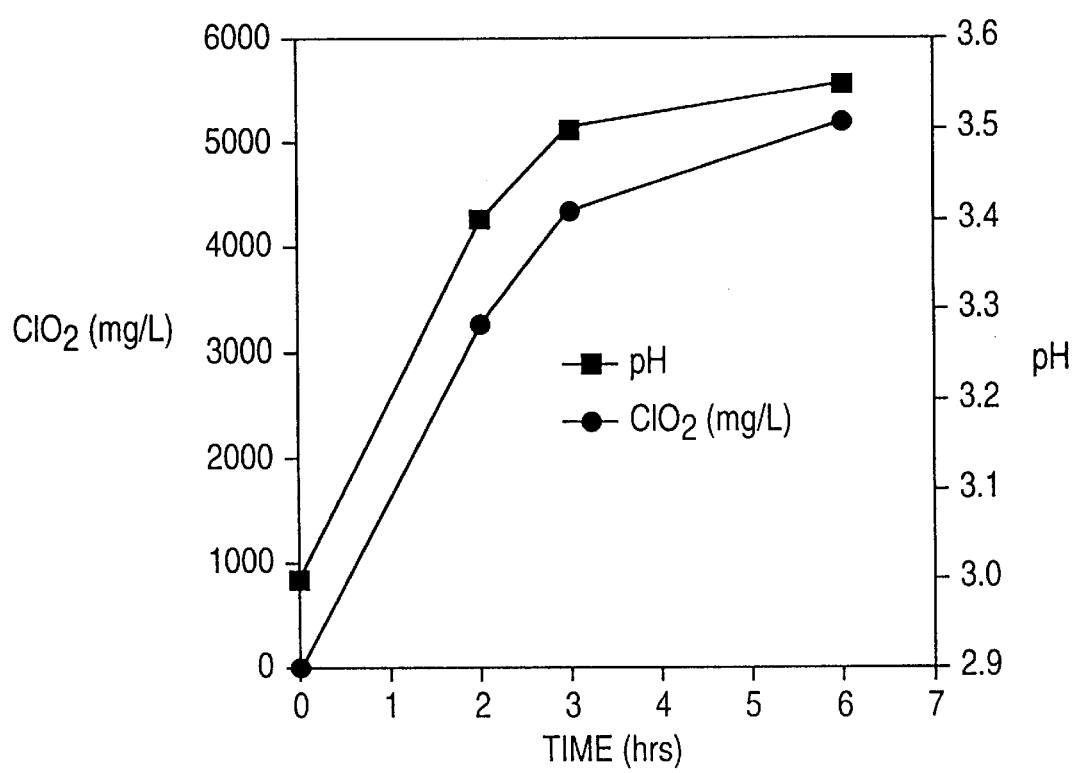
FIG. 21 is a plot of $ClO_2$ concentration and pH versus time according to one embodiment of the present invention.

FIG. 16 illustrates the effects of pH on time with initial charging of the acid reaction solution (the unbroken curved line to the upper left) as compared to incremental loading (the broken curved line to the lower right). It can be seen from FIG. 16 that incremental loading of the acid reaction solution will provide a lower pH and enable maintaining the pH at a lower value throughout the reaction. FIG. 21 shows a plot of both the $ClO_2$ production rate and the pH change as functions of time, as measured using the results of the simple mixing test discussed above. As seen from FIG. 21, the reaction rate decreases sharply with increasing time, even when the concentration of the reactants is near its initial strength. FIG. 21 also shows that pH increases in time, in particular, the increase in pH is very fast. Significantly, the sharp decrease in the reaction rate substantially overlaps the sharp increase in the pH.

On the basis of these findings, the inventor found that a first order rate expression as developed using the simple mixing test, was not adequate for accurately modeling the reaction rate, due to the strong reaction inhibition effect of increasing pH (i.e., decreasing hydronium ion concentration, see Equations R14 and R17). The inventor devised the following second order rate expression in an attempt to better understand the actual reaction mechanisms involved:

$$r_{ClO2}=k'C_{NaClO2}C_{H+}$$

where $r_{ClO2}$ is the rate of $ClO_2$ production in g/L/h and the C's denote the concentrations of the subscripted species in g/L.

As the expression indicates, as the reaction time increases, two factors, namely the depletion of reactant (sodium chlorite) and the depletion of the hydronium ion (increase in the pH), contribute to the decrease in the reaction rate. For example, according to the simple mixing test described above, at 30 hours, the concentration of sodium chlorite decreased from an initial value of 31,125 mg/l to 16,667 mg/l, or 53.5% of its original value, whereas the $H^+$ ion concentration dropped to 12.6% of its original concentration. By multiplying these two percentages, a value of about 6.7% of the initial reaction rate is obtained at 30 hours. This predicted value for the $ClO_2$ production rate corresponded very closely to the experimentally obtained value. Decreasing the rate to a value of about 6.7%, as occurred in the simple mixing test, however, is unacceptable from a commercial standpoint.

In an effort to decrease the substantial reduction in the reaction rate, the inventor undertook several experiments to study the effect of the reactant concentration and hydronium ion concentration on the reaction. In each of the following experiments, the total amount of acid and reactants were kept constant, but either all of the acid was loaded initially, or was loaded incrementally. The experiments were carried out in a batch mode according to the conditions of Example 1.

EXAMPLE 2a

About 600 ml of reactants, i.e., the entire amount was charged into a reactor at t=O. The pH change is monitored as a function of time and is shown in FIG. 16.

EXAMPLE 2b

Three different loadings of 200 ml each at each time interval, i.e., 200 ml (@t=0)+200 ml(@t=2)+200 ml(@t=4), for a total of 600 ml in 6 hours.

The reaction mixtures of Examples 2a and 2b were analyzed for the $ClO_2$ concentration at the 4 and 6 hour marks. At 4 hours, the reaction mixture of Example 2a had a ClO$_2$ concentration of 2,500 mg/L, whereas the reaction mixture of Example 2b had a ClO$_2$ concentration of 2,670 mg/L. This is particularly remarkable when considering that the mean residence time of the reaction mixture of Example 2a was 4 hours, whereas the mean residence time for the mixture of Example 2b was 3 hours (i.e., a half of the reactants for 4 hours and the other half for 2 hours).

At the six hour point, the reaction mixture of Example 2a had a concentration of 2,700 mg/L, while the reaction mixture of Example 2b had a ClO$_2$ concentration of 2,800 mg/L. The mean residence time of the reaction mixture of Example 2a was 6 hours, whereas the mean residence time of the reaction mixture of Example 2b was only 4 hours (i.e., a third for 6 hours, another third for 4 hours and the remaining third for 2 hours).

A plot of pH vs. time for Example 2b is shown in FIG. 16. As FIG. 16 shows, the single loading of Example 2a reached a higher level of pH much faster than the triple loading Example 2b. At every staged loading of Example 2b, the pH of the system was reduced to a lower level, and its increase thereafter was substantially the same as the initial loading of Example 2a.

The reaction characteristics of Examples 2a and 2b were consistent with the inventor's belief that inhibition reactions take place and that the original proposed first order reaction rate was not entirely accurate. Above a certain pH level, the reaction rate becomes almost negligible, or put another way, the reaction takes place only with fresh reactants and at an early stage.

From Examples 2a and 2b, the inventors were also able to confirm that the total length of reactant contact time is not as important as the time under the preferred conditions (i.e., lower pH, preferably below 4), as described above.

Based on the reaction mechanisms and equations first proposed and the experiments performed using the simple mixing test, the inventor was able to understand the role of acidity, and the need to maintain the reactor pH relatively low for an extended period of reaction time. As described herein, the expression "relatively low pH" and "low pH" denotes a pH at or below 4.

While any known method for maintaining low pH conditions throughout the period of reaction can be used according to the present invention, a number of preferred embodiments for maintaining the preferably low pH are described below. Two preferred embodiments include (i) reducing the amount of water present in the aqueous acid reaction solution, and (ii) increasing the amount of acid used in the reaction. Water is believed to have a dual purpose in the production of chlorine dioxide, i.e., as a reaction medium and as a product storage medium. However, a large amount of water can be detrimental due to its requirement for a large reactor and the inflexibility in pH control and adjustment when large amounts are used.

Several experiments were conducted by reducing the amount of water used in Example 1 by one half. These results are shown in Tables 7 and 17. As the results in Table 7 demonstrate, even in a batch mode where the product was also accumulated in the reactor, it took only 6 hours to achieve a product concentration of 7,853 mg ClO$_2$/L when the amount of water was reduced to one-half of its initial volume. Hence, over 1½ times the concentration of chlorine dioxide was achieved in ¼ of the time, when compared to the simple mixing test described above (i.e., nearly a 6 fold increase). Table 17 demonstrates the increase in production by using reduced amounts of water in continuous reaction systems, and using various reaction lengths, which are discussed more fully below.

TABLE 7

| 3.05 g | NaClO$_2$ |
|---|---|
| 2 ml | Lactic Acid |
| 10 ml | Acetic Acid |

| NaClO$_2$ is dissolved in 10 ml water | |
|---|---|
| Acids are placed in 35 ml water | |
| Covered | |
| pH | 3 |
| Volume | 57 ml |
| Temp | 22° C. |
| Sample Time | 6 hrs |
| Final pH | 3.5 |
| ClO$_2$ | 7,853 mg/L |
|  | 448 mg |
| ClO$_2^-$ | 32,708 mg/L |
|  | 1,864 mg |

Several experiments also were conducted by approximately doubling the amount of acid normally used in the embodiment according to Example 1. These results are shown in Table 8 below. As the results in the Table 8 demonstrate, the yield even in a batch operation at 22° C. took only 6 hours to reach 4,829 mg ClO$_2$/L, whereas in the simple mixing test, it took 24 hours to reach 5000 mg ClO$_2$/L, (i.e., nearly a 4 fold increase).

TABLE 8

| 3.06 g | NaClO$_2$ |
|---|---|
| 4 ml | Lactic Acid |
| 21 ml | Acetic Acid |

| NaClO$_2$ is dissolved in 10 ml water | |
|---|---|
| Acids are placed in 70 ml water | |
| Covered | |
| pH | 2.7 |
| Volume | 105 ml |
| Sample Time | 6 hrs |
| ClO$_2$ | 4,824 mg/L |
|  | 507 mg |
| ClO$_2^-$ | 19,543 mg/L |
|  | 2,056 mg |

Reducing the amount of water in the aqueous reaction solution and increasing the amount of both acids have the affect of keeping the reaction solution at a low pH for a prolonged amount of time so as to provide a sufficient concentration of hydronium ions, thus allowing the reaction to proceed at an unexpectedly faster rate. Using either approach, the amount of water is generally present in an amount within the range of from about 1.5 to 3.5 times the total amount of acid, by weight, and more preferably, about 3 times.

Another technique which is particularly preferred for providing and maintaining a low pH in the reaction mixture is the use of an acid prewash. An acid prewash is defined herein as the steps of bringing an inert carrier gas, such as nitrogen, into intimate contact with the aqueous acid solution, (the acid solution in this context contains either the hydroxy carboxylic acid, the companion acid or both) such as by bubbling the gas through the acid solution to produce an acid gas, whereby the acid gas subsequently contacts the reaction solution, which contains both acids and the alkali metal salt of a chlorite ion, by bubbling it through the reaction solution. In this embodiment, it is preferred to use relatively volatile acids that are capable of being entrained in an inert gas.

A preferred aqueous acid solution is an acetic acid solution. As used herein, an inert gas is defined as a gas which substantially does not take part in the chlorine dioxide production reaction and more preferably does not take part at all. Preferred gases include nitrogen, carbon dioxide, argon, and even air. An especially preferred inert gas is nitrogen. A volatile acid is defined herein as an acid which due to its high vapor pressure can be readily transferred to (i.e., entrained with) the gaseous phase under ambient or slightly above ambient conditions. The acid gas then is brought into intimate contact with the reaction solution, where the acid is transported back into solution, due to the mass transfer driving force. Using the acid pre-wash mechanism, the acid can be added to the reactor incrementally, thereby maintaining the pH at a low value, preferably below 4. The volatile acid concentration in the acid wash solution can be varied within wide limits. Those skilled in the art are capable of altering the temperature, concentration of volatile acid and flow rate of inert gas to provide for an adequate concentration which will enable suitable pH control, given the guidelines provided herein.

The effect on the pH of an aqueous reaction solution by using an acid pre-wash was investigated and the results are presented in Table 9. As Table 9 indicates, the initial pH of the reactor was 2.9 and the final pH was 3.3, whereas the initial pH of the acid pre-wash solution was 2.25 and the final pH was 2.5. Thus, acid pre-wash has the effect of maintaining the pH of the reaction solution in a range which provides sufficient hydronium ions for the production of $ClO_2$ to proceed at an economically feasible rate of about 5,626 mg/L/6 hours. This value can be compared to the 5,000 mg/L achieved after 24 hours that was achieved in the simple mixing test.

production of chlorine dioxide were investigated. As described above, increasing the concentration of companion acid coupled with increasing the reaction temperature to about 40° C. resulted in considerable improvements in chlorine dioxide production. Increasing the reaction temperature of a chemical process is not always favorable, however, since: (i) both main and side reactions are also simulated, including inhibition reactions; (ii) thermodynamic equilibrium may not be favored, which has the effect of limiting the extent of reaction; and (iii) the heat of reaction may become an important factor, especially for exothermic reactions. In addition, if chlorous acid is produced as a by-product, increasing the temperature may be hazardous.

As shown by the reaction equations and mechanisms described above, the aforementioned factors disfavoring increased temperature conditions likely are not present in the present invention. Thus, operating the reaction system of the invention at an elevated reaction temperature is preferred. Indeed, the temperature affect on the $ClO_2$ production reactions was found to be very significant as shown below.

Any known method for elevating the temperature of the reaction solution can be used according to the present invention. Preferred methods include an isothermal water bath surrounding the reactor, microwave heating of the aqueous reaction solution, immersible heating elements, etc. The reaction temperature can be at any temperature which allows for the reaction to take place. A preferred reaction temperature is greater than about 20° C., more preferably within the range of from about 30° C. to about 45° C., and most preferably about 40° C.

Using a small glassware system, experiments were carried out at various temperatures, in an isothermal water bath,

TABLE 9

Nitrogen Flow Experiment
Acid Wash
Nitrogen Flow rate 12 cc/min
Sampling Time 6 hours

| Type | Reaction Volume (mL) | $ClO_2$ (mg/L) | Total (mg) | $ClO_2^-$ (mg/L) | Total (mg) | Initial pH | Final pH |
|---|---|---|---|---|---|---|---|
| Acid wash | 200 | — | — | — | — | 2.25 | 2.5 |
| Reactor | 200 | 4,021.67 | 804.33 | 23,125.00 | 4,625.00 | 2.9 | 3.3 |
| Trap #1 | 1,000 | 310.33 | 310.33 | — | | | 4.4 |
| Trap #2 | 1,000 | 15.83 | 15.83 | — | | | 4.6 |
| Total | | 5,652.50 | 1,130.50 | | | | |

Reactor Equivalent $ClO_2$ = 5,653 mg/L.

According to one preferred embodiment, the effect of doubling the amount of companion acid while at the same reacting the solution at an elevated temperature of 40° C. was observed in a batch reaction. According to this embodiment, a chlorine dioxide concentration of 5,637 mg/L resulted after only 3 hours of reaction time, which represents over an 8 fold increase in chlorine dioxide production.

While the techniques for controlling pH described above are preferred, other techniques known in the art for achieving the same pH lowering effect can also be used according to the present invention.

EXAMPLE 3

In other embodiments according to the present invention, the effects of increasing the reaction temperature on the with combinations of different operating conditions, which are discussed more extensively below.

EXAMPLE 3a

The reaction system as described in Example 2 was operated at 20°, 30° and 40° C. For the 20° C. experiment, the reaction mixture was analyzed for $ClO_2$ at 2, 3 and 6 hours. For the 30° C. and 40° C. mixture, the reaction mixture was analyzed at 3 hours and 6 hours. The concentration at 3 hours is given below.

@ 20° C., 3,100 mg/L
@ 30° C., 4,300 mg/L
@ 40° C., 5,600 mg/l

Figure 17:
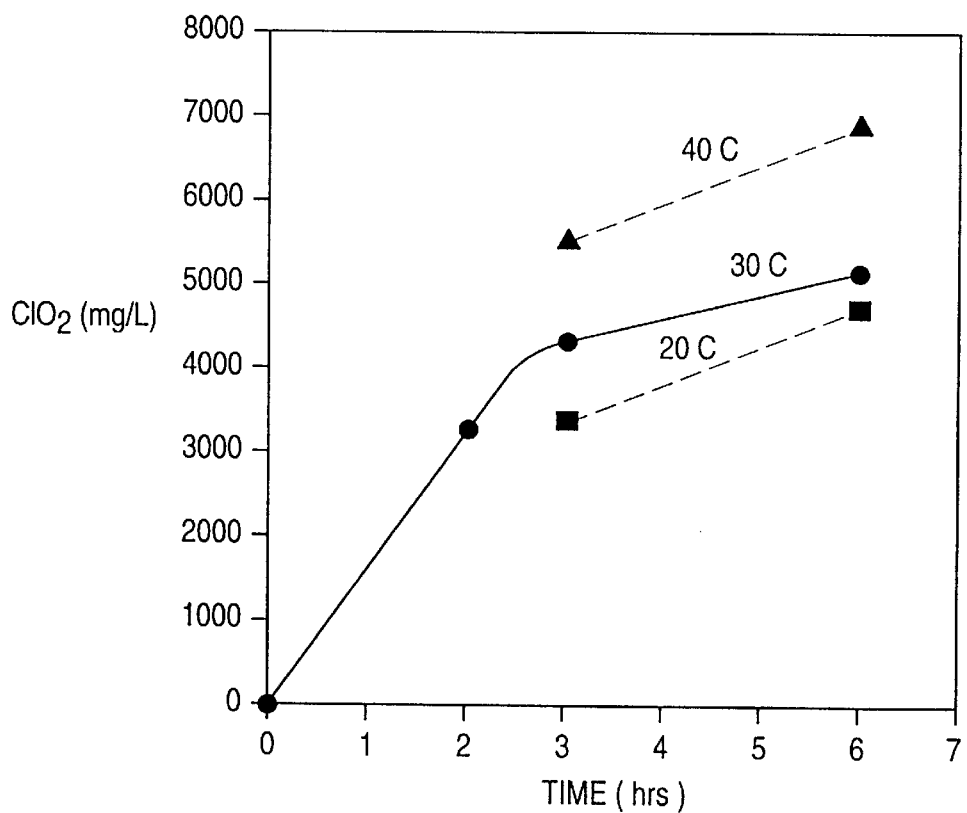
FIG. 17 is a plot of chlorine dioxide concentration versus time at 20°, 30° and 40° C. according to one embodiment of the present invention.

The results are also shown graphically in FIG. 17. As FIG. 17 demonstrates, higher concentrations of $ClO_2$ are obtained at higher temperatures at all times between 3 and 6 hours.

EXAMPLE 3b $NaClO_2$ (6.05 g) was dissolved in 20 ml of water. Lactic acid (4 ml) and acetic acid (20 ml) were admixed in 140 ml of water. The reaction solution containing $NaClO_2$ and acids was reacted at an initial temperature of 40° C. The sample times and temperatures are presented in Table 10 below.

TABLE 10

| 6.05 g | $NaClO_2$ |
|---|---|
| 4 ml | Lactic Acid |
| 20 ml | Acetic Acid |

| | |
|---|---|
| $NaClO_2$ is dissolved in 20 ml water | |
| Acids are placed in 140 ml water | |
| Volume | 184 ml |
| Temp. | 40 C |
| Sample Time | 3 hrs |
| Temp. | 43 C |
| $ClO_2$ | 5,543 mg/L |
| | 1,020 mg |
| $ClO_2^-$ | 27,083 mg/L |
| | 4,983 mg |
| Sample Time | 6 hrs |
| Temp. | 54 C |
| $ClO_2$ | 6,976 mg/L |
| | 1,284 mg |
| $ClO_2^-$ | 17,292 mg/L |
| | 3,182 mg |

Example 3c $NaClO_2$ (6.07 g) was dissolved in 20 ml of water. Lactic acid (4 ml) and acetic acid (20 ml) were combined in 150 ml of water. The $NaClO_2$ and acid reaction solutions were combined for a total volume of 194 ml at an initial temperature of 27° C. The reaction mixture was heated and the sample times and temperature are presented in Table 11 below.

TABLE 11

| 6.05 g | $NaClO_2$ |
|---|---|
| 4 ml | Lactic Acid |
| 24 ml | Acetic Acid |

| | |
|---|---|
| $NaClO_2$ is dissolved in 20 ml water | |
| Acids are placed in 150 ml water | |
| Volume | 194 ml |
| pH | 27 C |
| Sample Time | 3 hrs |
| Temp. | 43 C |
| $ClO_2$ | 5,399 mg/L |
| | 1,047 mg |
| $ClO_2^-$ | 22,569 mg/L |
| | 4,378 mg |
| Sample Time | 6 hrs |
| Temp. | 54 C* |
| $ClO_2$ | 5,130 mg/L |
| | 995 mg |
| $ClO_2^-$ | 10,938 mg/L |
| | 2,122 mg |

*Yellow gas rolled out of the beaker when it was opened

As the results in Table 11 indicate, maintaining the reaction solution at 43° C for 3 hours provided a $ClO_2$ concentration of 5,399 mg/L. This is compared to 3,853 mg/L of $ClO_2$ for 6 hours for Example 1 and 2,700 mg/L for 6 hours for the simple mixing test. As Table 11 also indicates, when the temperature was increased to 54° C., the reaction solution started to decompose, and a yellow gas evolved when the beaker containing the reaction solution was opened. EXAMPLE 4

As additional preferred embodiment of the present invention is to separate at least a portion of the product from the reaction solution during the reaction process. This can be done in addition to, or in lieu of, maintaining the pH of the reaction solution at a value of less than about 5. This separation is believed to serve two purposes. One is to provide $ClO_2$ which is substantially free of the unreacted reactants and other side products such as $NaClO_2$ and $NaClO_3$. The other purpose is to prevent the reaction mixture from reaching chemical equilibrium. In other words, since the reactor will not have to serve as a product storage unit, the chemical equilibrium limitation in the $ClO_2$ formation reaction will be alleviated.

In order to separate at least a portion of the $ClO_2$ from the reaction solution, any known separating processes can be used according to the present invention. Preferred separating processes include passing the reaction solution through packed beds or an absorption column, and stripping. A particularly advantageous mechanism is continuously reacting the reaction solution and continuously withdrawing product solution, and then subsequently treating the product solution by stripping, optionally condensing and then absorbing. Since there is a substantial difference between the vapor pressure of $ClO_2$ and the vapor pressure of the other chemical species present in the product solution, a separation technique which utilizes a difference in vapor pressures is preferred. An especially preferred separating technique is to pass a gas, preferably an inert carrier gas, through the product solution. This can take place either (i) while the product solution is in the reactor, or (ii) after the product solution is removed from the reactor. Preferably, this stripping process occurs after the product gas is removed from the reactor. The inert gas, which contains chlorine dioxide, then can be passed through one or more water traps to remove the $ClO_2$ from the inert gas. The expression "water trap," as used herein, generally denotes a vapor-liquid absorber.

Figure 18:
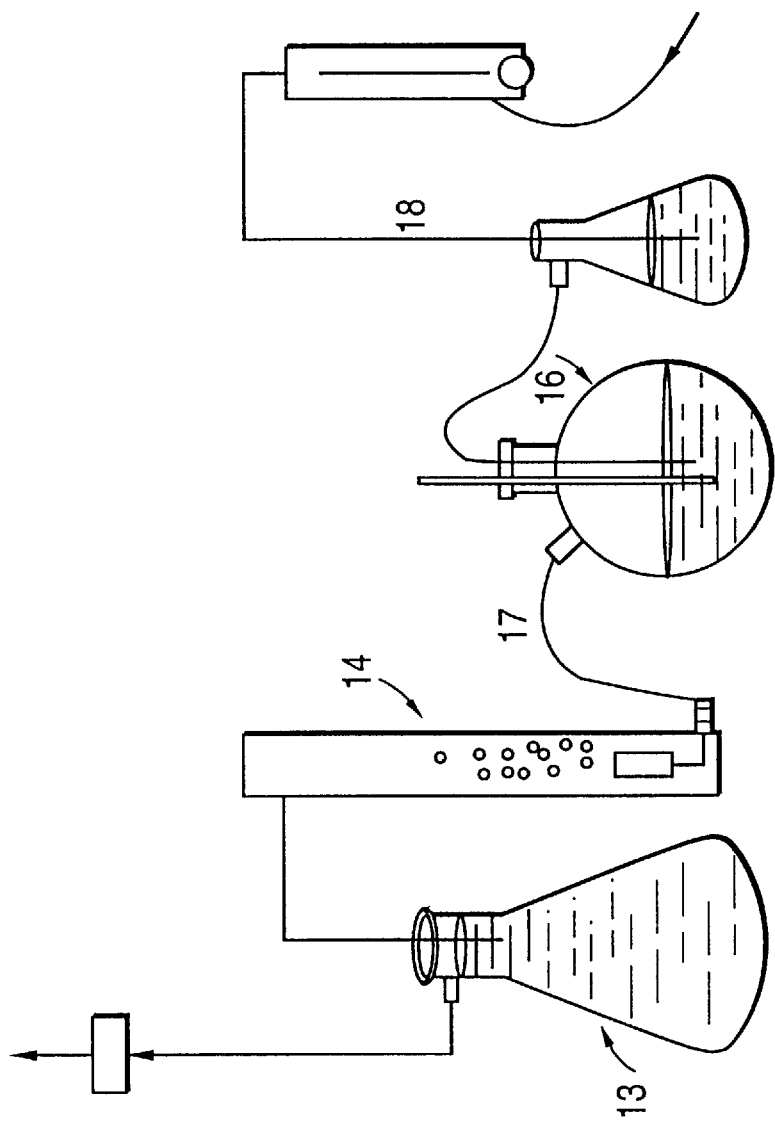
FIG. 18 is a schematic view of benchtop components used for chlorine dioxide according to one embodiment of the present invention.

A schematic diagram according to one separation embodiment of the invention is shown in FIG. 18. As FIG. 18 illustrates, two water traps 13, 14 in serial are placed after the reactor vessel 16. These traps serve to strip the $ClO_2$ present in a product gas 17 which has been passed through reactor vessel 16. The inert carrier gas 18 preferably is selected from nitrogen or argon, and most preferably is nitrogen. Generally, two water traps are sufficient to scrub substantially all of the $ClO_2$ from the product gas 17. As used herein, the term "substantially all," is defined as the removal of 99% or greater of the $ClO_2$ entrained in the product gas stream. Although two water traps are shown in FIG. 18, more or less traps may be used depending on system requirements.

If a water trap is used, the inventors have found that as a general rule of thumb, a vertically long, relatively small volume trap with a low inert gas flow rate, attains a higher concentration of $ClO_2$ in the solution and is thus preferred. Usually, the volume of the water trap is within the range of from about 10% to about 200% of the reactor volume. Another preferred condition is maintaining the temperature of the traps at a low temperature, due to the greater solubility of the chlorine dioxide in the water at lower temperatures. The temperature of the traps is generally within the range of from 4° C. to about 25° C., preferably, within the range of from about 10° C. to about 20° C.

EXAMPLE 4a

The conditions of Example 1 were repeated with the addition of two 150 ml traps and a reactor volume 200 ml. The results are shown in FIG. 19.

EXAMPLE 4b

Example 4a was repeated with the exception that the two water traps both had a volume of 2000 ml. The results are shown in FIG. 20.

Figure 19:
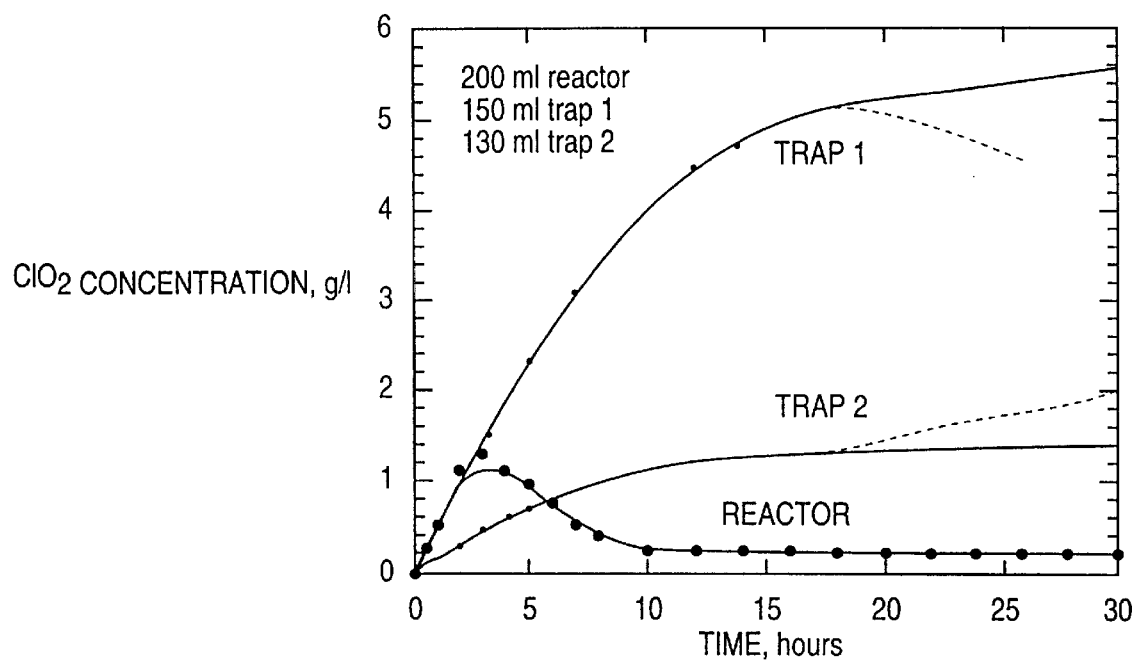
FIG. 19 is a plot of $ClO_2$ concentration versus time for small volume product traps and the reactor according to one embodiment of the present invention.
Figure 20:
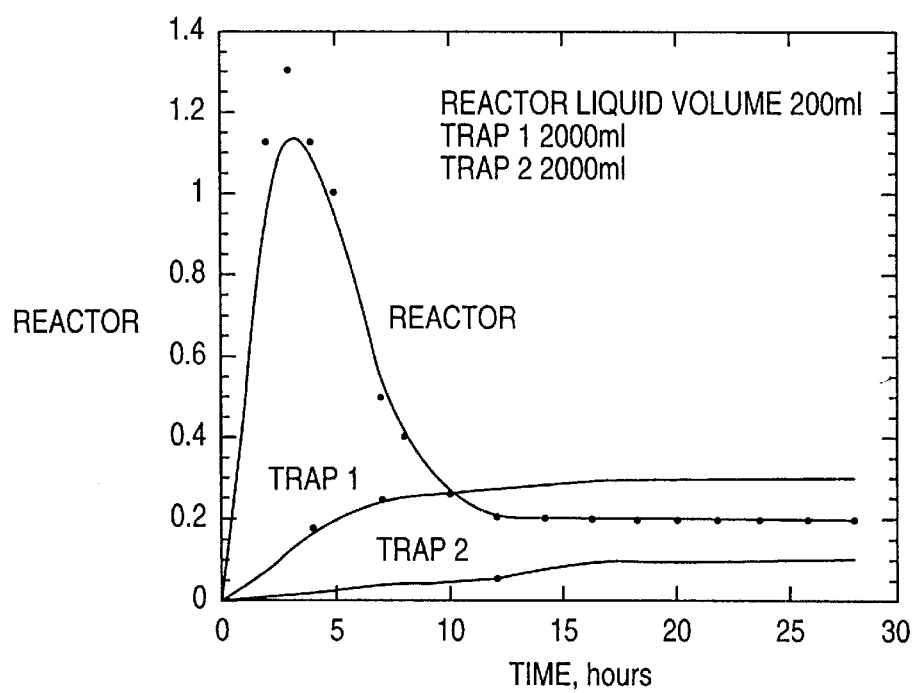
FIG. 20 is a plot of $ClO_2$ concentration versus time for large volume product traps and the reactor according to one embodiment of the present invention.

As FIGS. 19 and 20 demonstrate, the $ClO_2$ concentration in the first trap for Example 4a was greater than 5,000 mg/l, whereas in Example 4b the concentration did not even reach 400 mg/l. These results illustrate that the maximum concentration attainable by the product trap can depend upon the geometrical shape and dimensions, whereas the maximum peak concentration temporarily achieved by the reactor is more dependent upon the flow rate of the nitrogen sweep gas.

EXAMPLE 5

The discovery of the reaction equations and kinetics described herein assisted the inventors in determining the variables that have the greatest impact on the production of chlorine dioxide. The inventors therefore were capable of adjusting these variables in a direction to favor the reactions shown in the above equations.

In especially preferred embodiments of the present invention, the present inventors have found that by combining several of the above features (i.e., increase pH, increase temperature, product removal and separation), enabled especially high yields of chlorine dioxide.

According to one preferred embodiment, in a batch reaction similar to that described in Example 3b, the effect of doubling the amounts of acid while at the same time reacting the solution at an elevated temperature of 40° C. was observed. The conditions and results are presented in Table 12 below. As Table 12 indicates, a chlorine dioxide concentration of 5,637 mg/L resulted after only 3 hours of reaction time.

TABLE 12

| 6.04 g | $NaClO_2$ |
| 8 ml | Lactic Acid |
| 40 ml | Acetic Acid |

| | |
|---|---|
| $NaClO_2$ is dissolved in 10 ml water | |
| Acids are placed in 140 ml water | |
| Volume | 208 ml |
| Temp. | 40 C |
| Sample Time | 3 hrs |
| Temp. | 43 C |
| $ClO_2$ | 5,637 mg/L |
| | 1,172 mg |
| $ClO_2^-$ | 20,833 mg/L |
| | 4,333 mg |
| $ClO_2$ | 6,523 mg/L |
| | 1,357 mg |
| $ClO_2$** | 1,580 mg |

According to other preferred embodiments, the effects of providing an inert sweep gas, increased temperature and an acid prewash was investigated. A system similar to that shown in FIG. 18 was used to separate the product from the reaction solution. The conditions and results are presented below in Tables 13–16.

The reactor equivalent is defined as the concentration in the reactor which would have existed if all the $ClO_2$ which had been produced (i.e., the combined amounts in the traps downstream and the amount actually remaining in the reactor) had remained in the reactor.

TABLE 13

Example 5b

| 6.06 g | $NaClO_2$ | Sample Time | 3 hrs |
| 4 ml | Lactic Acid | Reactor | |
| 20 ml | Acetic Acid | Temp. | 39.3 |
| $NaClO_2$ is dissolved in | | pH | 3.4 |
| 20 ml water | | $ClO_2$ | 6,413 mg/L |
| Acids are placed in 150 ml water | | | 1,244 mg |
| Volume | 194 ml | $ClO_2^-$ | 21,354 mg/L |
| Temp. | 39.5 C | | 4,143 mg |
| Trap #1 | 1,000 ml | Trap #1 | |
| Trap #2 | 750 ml | pH | 4.9 |
| Acid Prewash | | $ClO_2$ | 134 mg/L |
| Water | 150 ml | | 134 mg |
| Acetic Acid | 40 ml | Trap #2 | |
| Lactic Acid | 8 ml | pH | 5.3 |
| | | $ClO_2$ | 1.07 mg/L |
| | | | 0.81 mg |
| | | Total $ClO_2$ | 1,379 mg |
| | | Total $ClO_2^-$ | 4,143 mg |
| | | Reactor Equiv. | 7,108 mg/L |

TABLE 14

Example 5c

| 7.5 g | $NaClO_2$ | Sample Time | 3 hrs |
| 5 ml | Lactic Acid | Temp. | 39.5 C |
| 25 ml | Acetic Acid | Reactor | |
| $NaClO_2$ is dissolved in | | pH | 3.5 |
| 25 ml water | | $ClO_2$ | 3,167 mg/L |
| Acids are placed in 188 ml water | | | 770 mg |
| Volume | 243 ml | $ClO_2^-$ | 2,500 mg/L |
| In. temp. | 37.5 C | | 3,038 mg/L |
| Bath | 39.5 C | Trap #1 | |
| Flow | 15 cc/min | pH | 3.9 |
| Trap #1 | 1,000 mL | $ClO_2$ | 470 mg/L |
| Trap #2 | 750 mL | | 470 mg |
| Acid Prewash | | Trap #2 | |
| Water | 188 mL | pH | 5.3 |
| Acetic Acid | 50 mL | $ClO_2$ | 17.08 mg/L |
| Lactic Acid | 10 mL | | 12.81 mg |
| | | Lactic Acid | 1,253 mg |
| | | Total $ClO_2^-$ | 3,038 mg |
| | | Reactor Equiv. | 5,156 mg/L |
| | | Sample Time | 6 hrs |
| | | Reactor | |
| | | Temp. | 39.5 C |
| | | pH | 3.6 |
| | | $ClO_2$ | 2,006 mg/L |
| | | | 487 mg |
| | | $ClO_2^-$ | 9.375 mg/L |
| | | | 2,278 mg |
| | | Trap #1 | |
| | | pH | 4.3 |
| | | $ClO_2$ | 846 mg/L |
| | | | 846 mg |
| | | Trap #2 | |
| | | pH | 4.5 |
| | | $ClO_2$ | 53.33 mg/L |
| | | | 40.00 mg |
| | | Total $ClO_2$ | 1,373 mg |
| | | Total $ClO_2^-$ | 2,278 mg |
| | | Reactor Equiv. | 5,650 mg/L |

TABLE 15

Example 5d

| 7.54 g | NaClO$_2$ | Sample Time | 3 hrs |
| 5 ml | Lactic Acid | Temp. | 39.5 C |
| 25 ml | Acetic Acid | Reactor | |
| NaClO$_2$ is dissolved in | | pH | 3.5 |
| 25 ml water | | ClO$_2$ | 3,800 mg/L |
| Acids are placed in 188 ml water | | | 923 mg |
| Volume | 243 ml | ClO$_2^-$ | 14,583 mg/L |
| In. temp. | 37.5 C | | 3,544 mg/L |
| Bath | 39.5 C | Trap #1 | |
| Flow | 15 cc/min | pH | |
| Trap #1 | 1,000 mL | ClO$_2$ | 428 mg/L |
| Trap #2 | 750 mL | | 428 mg |
| Acid Prewash | | Trap #2 | |
| Acetic Acid | 62 mL | pH | |
| Lactic Acid | 12 mL | ClO$_2$ | 10.88 mg/L |
| Water | 125 mL | | 8.16 mg |
| | | Lactic Acid | 1,359 mg |
| | | Total ClO$_2^-$ | 3,544 mg |
| | | Reactor Equiv. | 5,593 mg/L |
| | | Sample Time | 6 hrs |
| | | Reactor | |
| | | Temp. | 39.5 C |
| | | pH | 3.6 |
| | | ClO$_2$ | 2,164 mg/L |
| | | | 526 mg |
| | | ClO$_2^-$ | 10,417 mg/L |
| | | | 2,531 mg |
| | | Trap #1 | |
| | | pH | 4.2 |
| | | ClO$_2$ | 798 mg/L |
| | | | 798 mg |
| | | Trap #2 | |
| | | pH | 4.5 |
| | | ClO$_2$ | 46.67 mg/L |
| | | | 35.00 mg |
| | | Total ClO$_2$ | 1,359 mg |
| | | Total ClO$_2^-$ | 2,531 mg |
| | | Reactor Equiv. | 5,531 mg/L |

TABLE 16

Example 5e

| 7.54 g | NaClO$_2$ | Sample Time | 3 hrs |
| 5 ml | Lactic Acid | Reactor | |
| 25 ml | Acetic Acid | pH | 3.6 |
| NaClO$_2$ is dissolved in | | ClO$_2$ | 3,325 mg/L |
| 25 ml water | | | 808 mg |
| Acids are placed in 188 ml water | | ClO$_2^-$ | 13,542 mg/L |
| Volume | 243 ml | | 3,291 mg |
| In. Temp. | 38 C | Trap #1 | |
| Bath | 40 C | pH | 4.5 |
| Flow | 15 cc/min | ClO$_2$ | 542 mg/L |
| Trap #1 | 1,000 mL | | 542 mg |
| Trap #2 | 750 ml | Trap #2 | |
| Acid Wash | | pH | 5.6 |
| Acetic Acid | 250 mL | ClO$_2$ | 11.88 mg/L |
| | | | 8.91 mg |
| | | Total ClO$_2$ | 1,358 mg |
| | | Total ClO$_2^-$ | 3,291 mg |
| | | Reactor Equiv. | 5,588 mg/L |

As Examples 5b–e indicate, there was increased acidity in both traps 1 and 2 due to the acid carry over by the nitrogen sweep gas. Although increasing acidity of the traps is not a substantial drawback, it leads to higher cost due to: (i) the additional acid which has to be provided to the reactor to compensate for the acid which is carried over to the traps; and (ii) any neutralization required if the ClO$_2$ cannot be used in an acidic medium. To minimize the acid carry over, the inventors have found that an inert gas flow rate in the range of from about 0.01 cc/cc/sec. to 1 cc/cc/sec, preferably within the range of from about 0.05 cc/cc/sec to about 0.2 cc/cc/sec.

EXAMPLE 6

According to another preferred embodiment, a continuous reaction system utilizing both high temperatures, product collection and pH control was tested. A system similar to that exemplified in FIG. 22 was employed. The results are presented in Table 17 below. As Table 17 indicates, a total of nine runs were completed varying both the reactor length and amount of water used. The reactor used was a half-gallon tubular reactor which was operated continuously at 40° C., along with stripping with a nitrogen flow. The reactor was made of 3 coils of ⅝ inch Teflon coated polyethylene tubing. Each coil was 50 feet (1,524 cm) long with an internal volume of 484 ml, thereby providing a 1,449 ml reactor, when the reaction solution was run through all three coils.

Figure 22:
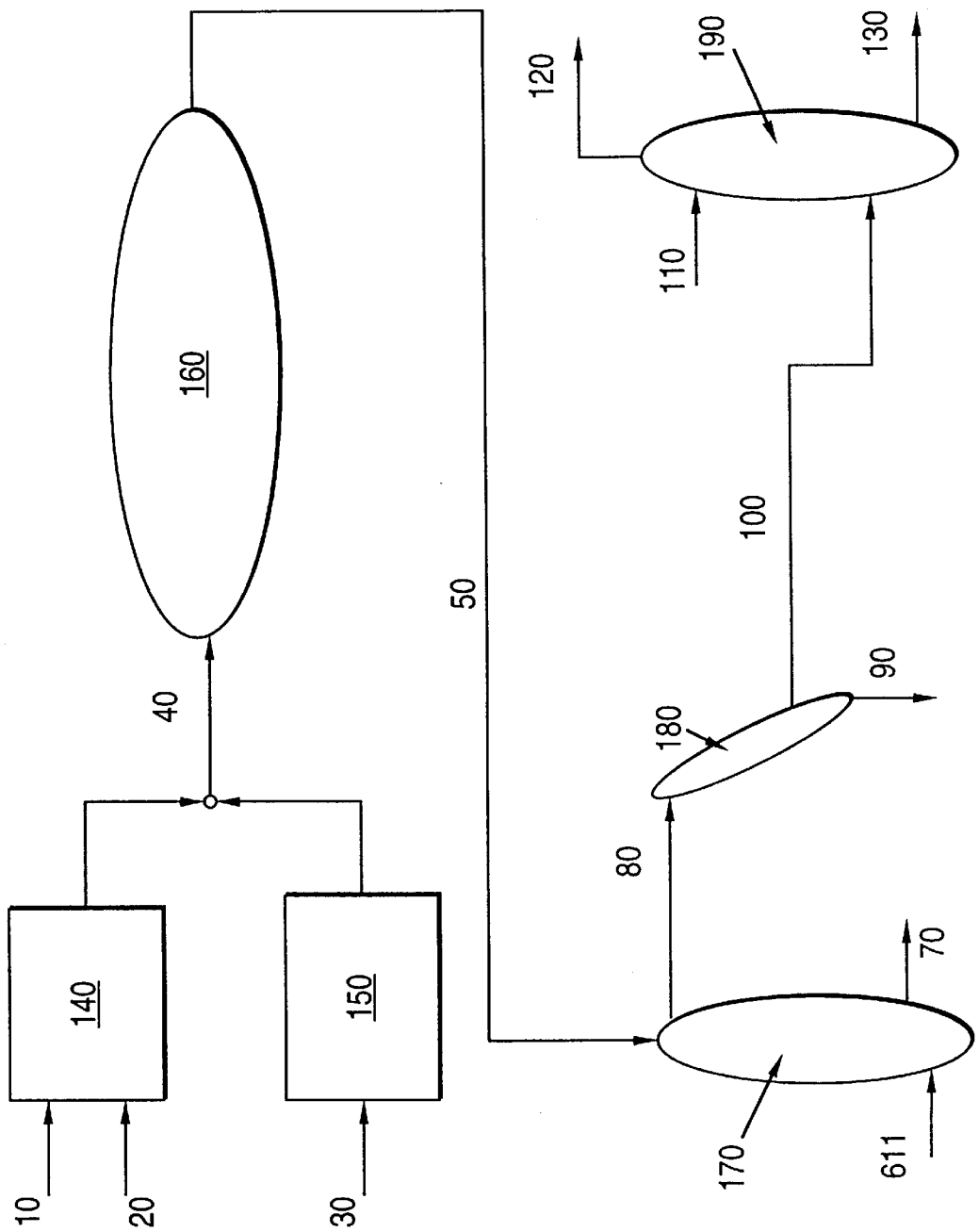
FIG. 22 is a flow/schematic diagram of the process and apparatus for producing chlorine dioxide according to one embodiment of the present invention.

As shown in FIG. 22, acetic acid 10 and lactic acid 20 were fed to and admixed in an acid storage tank 140. Sodium chlorite 30 was fed to a sodium chlorite storage tank 150. An aqueous acid solution was admixed with the sodium chlorite and fed via line 40 to tubular reactor 160. Product solution 50 was fed to a ClO$_2$ stripping unit 170 and contacted countercurrently with nitrogen gas 60. Unreacted sodium chlorite was withdrawn via line 70 and product gas 80 was fed to condenser 180 to condense any acid present in the product gas 80. The condensed acid solution was withdrawn via line 90 and a chlorine dioxide-containing gas 100 was fed to a ClO$_2$ scrubbing unit 190. Water 110 contacted gas mixture 100 whereby scrubbed nitrogen was removed via vent 120 and aqueous chlorine dioxide was withdrawn via line 130.

TABLE 17

| Ex. | Amount of Water | Reactor Length (cm) | Initial NaClO$_2$ (mg/L) | Final ClO$_2^-$ (mg/L) | ClO$_2$ (mg/L) | Conversion | Time (min.) |
| --- | --- | --- | --- | --- | --- | --- | --- |
| 6a | Original | 1,524 | 32,850 | 20,139 | 3,452 | 14.18% | 48 |
| | | 3,048 | | 15,104 | 4,096 | 16.82% | 96 |
| | | 4,572 | | 16,484 | 4,666 | 19.16% | 144 |
| 6b | ½ Water | 1,524 | 65,278 | 54,792 | 10,872 | 22.47% | 48 |
| | | 3.048 | | 44,792 | 11,875 | 24.54% | 96 |
| | | 4,572 | | 35,000 | 11,495 | 23.76% | 144 |
| 6c | ⅓ Water | 1,524 | 97,778 | 85,417 | 23,275 | 32.12% | 48 |
| | | 3,048 | | 62,500 | 20,900 | 28.84% | 96 |
| | | 4,572 | | 37,500 | 18,050 | 24.91% | 144 |

As seen from Table 17, the maximum chlorine dioxide concentration was for the run using ⅓ the normal amount of water and using a single coil reactor. This provided an unexpectedly high concentration of 23,275 mg/L of ClO$_2$ in only 48 minutes which represents nearly a 140 fold increase in chlorine dioxide productivity. Thus, this embodiment of the present invention provides a reproducible concentration of ClO$_2$ which was previously unattainable according to the known methods for producing chlorine dioxide, including simply mixing a companion acid, a hydroxy carboxylic acid and an alkali metal salt of a chlorite ion. Indeed, this amount of chlorine dioxide far exceeds that obtained in the simple mixing test, even after the system used therein was allowed to react for an entire day. The sodium chlorite selectivity (or, pure product conversion) to chlorine dioxide reached over 32% in only 48 minutes.

The inventor also observed that the reactor was supersaturated with the chlorine dioxide vapor and was under a mild pressure due to the presence of the chlorine dioxide vapor. With this high of a concentration of chlorine dioxide, it becomes very important to utilize safe handling and storage of the product due to its mild explosiveness at concentrations in air greater than 11%.

In another preferred embodiment, additional experiments were undertaken varying certain parameters of the methods described above.

EXAMPLE 7

Figure 23:
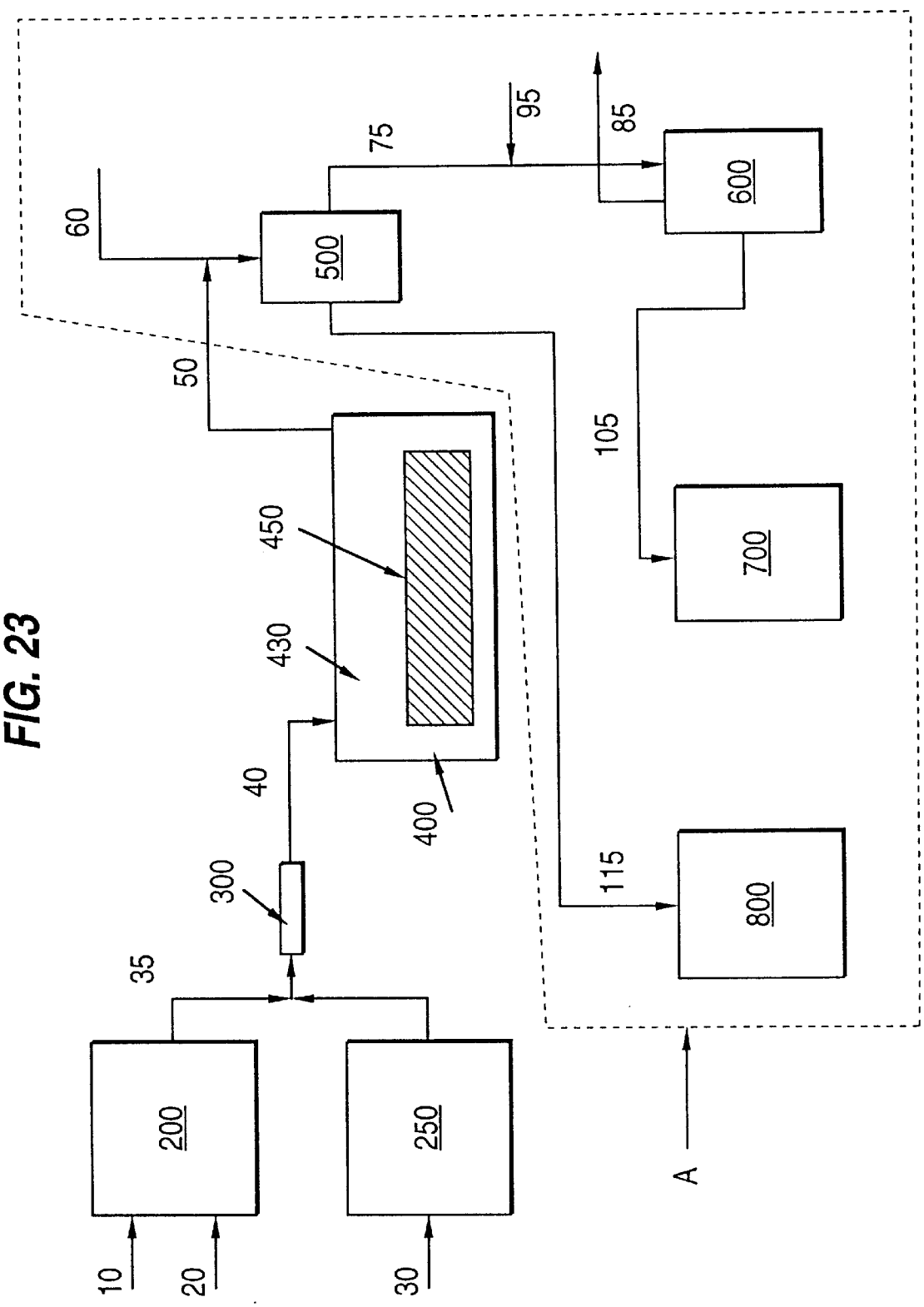
FIG. 23 is a flow/schematic diagram of the process and apparatus for producing chlorine dioxide according to one embodiment of the present invention.

A system similar to that shown in FIG. 23 was operated using the following reaction conditions.

| Chlorite Storage Unit 200 | 352 g | $NaClO_2$ 30 |
| --- | --- | --- |
| | 1,800 ml | Water (may be increased)* |
| Acid Storage Unit 250 | 800 ml | Acetic Acid 10 |
| | 160 ml | Lactic Acid 20 |
| | 870 ml | Water (may be increased)* |
| Pumps #1 | 5 cc/min | |
| #2 | 5 cc/min | |
| #3 | 10 cc/min | |
| Reactor Residence Time | 48 min/each reactor coil | |
| | 145 min total for three 50' coils | |
| Product Concentration | over 15,000 mg/L | |

*, The numbers given are for a super-high product concentration case.

Pump #1 pumps acid from acid storage unit 200, pump #2 pumps sodium chlorite from Chlorite storage unit 250 and pump #3 pumps stripped product 115 from stripper 500.

For most runs, more amounts of water may be used.

For most runs, one or two coils may be used instead of three.

The continuous reactor embodiment illustrated in FIG. 23 provides a high concentration of chlorine dioxide in a short period of time. Companion acid 10 and hydroxy carboxylic acid 30 are fed to acid storage unit 200 along with water for dilution, and aqueous alkali metal salt of a chlorite ion is fed to chlorite storage unit 250. Aqueous acid solution 35 is combined with the sodium chlorite and mixed in mixer 300 and the mixed reaction solution is fed to reactor 400. Preferably, mixer 300 includes a mixer packed with glass beads although other mixers using conventional stirring mechanisms are contemplated within the context of the present invention. Reactor 400 can be any reactor capable of reacting the respective components, and preferably it contains multiple coils 450 surrounded by a water jacket 430.

Product solution 50 then is fed to stripper 500 whereby it is stripped with an inert carrier gas 60, such as nitrogen. Stripped product is removed via line 115 and fed to stripped product storage unit 800, and product gas 75 is fed to an absorber 600 where it is contacted with water 95. Inert gas is vented via vent 85 and aqueous chlorine dioxide is fed via line 105 to $ClO_2$ storage unit 700.

Figure 24:
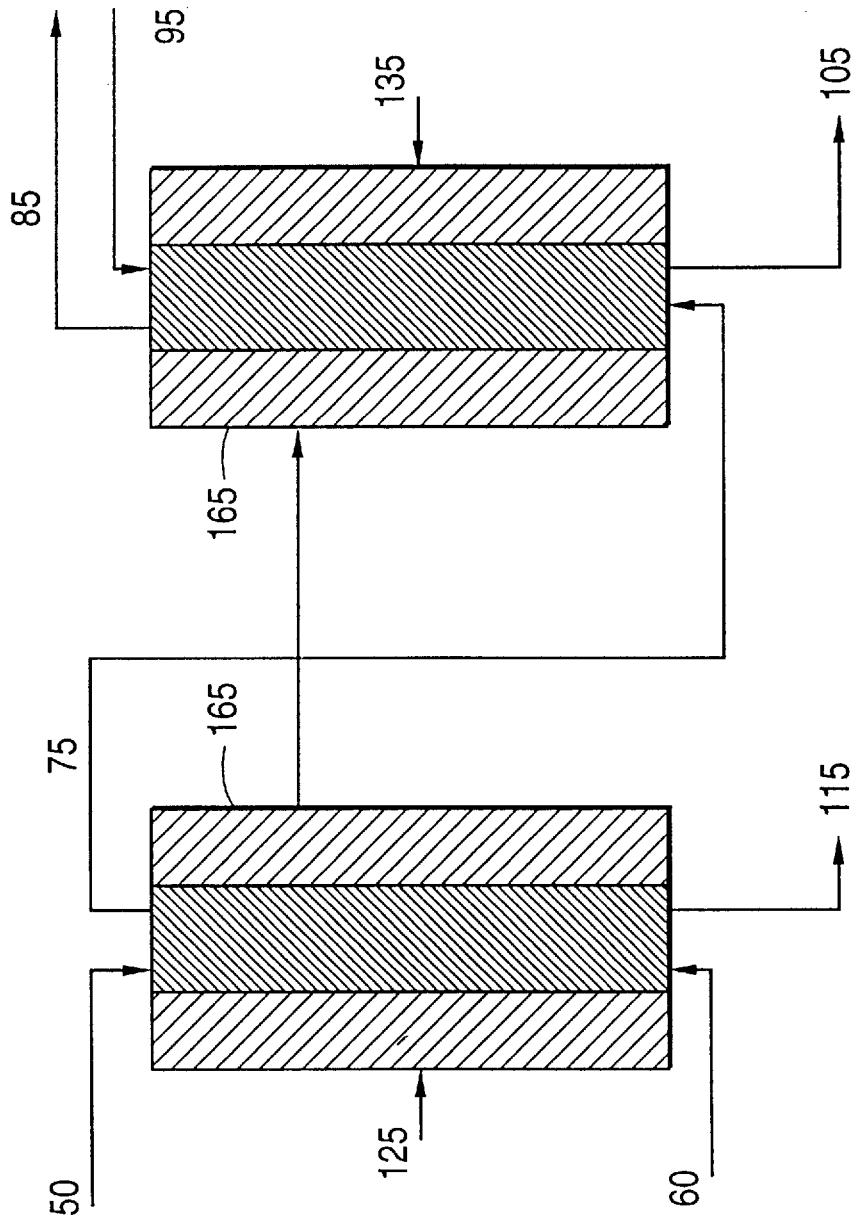
FIG. 24 is a flow/schematic diagram of an alternative embodiment of area A of FIG. 23.

Encircled area "A" in FIG. 23 can be replaced by a two-stage countercurrent contacting cascade, as illustrated in FIG. 24. Here, product solution 50 is fed to a first contactor 125 whereby it is contacted countercurrently with an inert carrier gas 60. Stripped product 115 is removed at the bottom of contactor 125 and product gas 75 is removed at the top and fed to the bottom of contactor 135. Preferably, both contactors 125, 135 are surrounded by a water jacket 165. Product gas 75 is contacted with water 95 in contactor 135 whereby inert gas is vented via vent 85 and aqueous chlorine dioxide is removed via line 105.

As Example 7 indicates, a repeatable continuous process for the production of a high concentration of chlorine dioxide within a short period of time is possible without the formation of undesirable and hazardous by-products is now within the reach of those skilled in the art.

Other embodiments of the invention will be apparent to those skilled in the art from consideration of the specification and practice of the invention disclosed herein. It is intended that the specification be considered as exemplary only, with the true scope and spirit of the invention being indicated by the following claims.

The disclosure of all publications described above expressly are incorporated herein by reference in their entirety. In the claims that follow, the terms "a" and "an" shall mean "at least one" unless otherwise indicated.

What is claimed is:

1. A process for producing chlorine dioxide, comprising the steps of:

A providing an aqueous acid solution comprising
1 a hydroxy carboxylic acid that is capable of temporarily transferring chlorine from an alkali metal salt of chlorite ion, but substantially does not form a salt with an alkali metal salt of a chlorite ion, and
2 a companion acid that substantially does not react with an alkali metal salt of a chlorite ion;

B combining, in a vessel, (i) an alkali metal salt of a chlorite ion, and (ii) said aqueous acid solution, to yield an aqueous reaction solution; and C maintaining the pH of the aqueous reaction solution at a value of $\leq 4$ during the reaction of (i) and (ii), wherein chlorite ions are produced in said aqueous reaction solution, and said chlorite ions react with said hydroxy carboxylic acid present therein to yield an aqueous product solution that comprises chlorine dioxide but is substantially free of chlorous acid.

2. A process for producing chlorine dioxide as claimed in claim 1, wherein Step C is carried by maintaining the pH of the resulting reaction solution at a value of $\leq 4$ by addition of a sufficient amount of companion acid.

3. A process for producing chlorine dioxide as claimed in claim 2, wherein Step C is carried out by stepwise addition of companion acid during the reaction.

4. A process for producing chlorine dioxide as claimed in claim 2, wherein Step C is carried out by continuous addition of companion acid during the reaction.

5. A process for producing chlorine dioxide as claimed in claim 2, wherein Step C is carried out by:
1 flowing inert gas through said either or both of said hydroxy carboxylic acid and said companion acid, wherein a portion of either or both acids is entrained to yield an acid gas that comprises said inert gas and acid; and
2 flowing said acid gas into the aqueous reaction solution, so that at least a portion of the acid in said acid gas is absorbed into the aqueous reaction solution.

6. A process for producing chlorine dioxide as claimed in claim 1, wherein the weight ratio of water to acid in said aqueous acid solution is from about 1.5 to about 3.5.

7. A process for producing chlorine dioxide as claimed in claim 1, wherein the weight ratio of water to acid in said aqueous acid solution is about 3.

8. A process for producing chlorine dioxide as claimed in claim 1, wherein the temperature of the vessel is maintained at about 40° C.

9. A process for producing chlorine dioxide as claimed in claim 1, further comprising the step of separating at least a portion of the chlorine dioxide from said aqueous product solution.

10. A process for producing chlorine dioxide as claimed in claim 9, wherein the separation of at least a portion of chlorine dioxide comprises flowing an inert carrier gas through said aqueous product solution, wherein at least a portion of the chlorine dioxide is entrained in the inert gas to provide a product gas stream comprising said inert gas and chlorine dioxide.

11. A process for producing chlorine dioxide as claimed in claim 10, wherein the inert gas is nitrogen gas.

12. A process for producing chlorine dioxide as claimed in claim 10, wherein substantially all of the chlorine dioxide present in said aqueous product solution is entrained in said inert carrier gas.

13. A process for producing chlorine dioxide as claimed in claim 10, wherein the separation of the chlorine dioxide further comprises passing the product gas through a trap comprising aqueous liquid, wherein at least a portion of the chlorine dioxide in said product gas stream is absorbed into the aqueous liquid in the trap.

14. A process for producing chlorine dioxide as claimed in claim 13, wherein the trap has a volume within the range of from about 10% to about 200% of the total reactor volume.

15. A process for producing chlorine dioxide as claimed in claim 1, wherein said hydroxy carboxylic acid is lactic acid.

16. A process for producing chlorine dioxide as claimed in claim 15, wherein said companion acid is acetic acid.

17. A process for producing chloride dioxide, comprising the steps of:
  A providing an aqueous acid solution comprising
    1 a hydroxy carboxylic acid that is capable of temporarily transferring chlorine from an alkali metal salt of chlorite ion, but substantially does not form a salt with an alkali metal salt of a chlorite ion, and
    2 a companion acid that substantially does not react with an alkali metal salt chlorite ion;
  B combining, in a vessel, (i) an alkali metal salt of a chlorite ion, and (ii) said aqueous acid solution, to yield an aqueous reaction solution;
wherein chlorite ions are produced in said aqueous reaction solution, and said chlorite ions react with said hydroxy carboxylic acid present therein to yield an aqueous product solution that comprises chlorine dioxide but is substantially free of chlorous acid, and wherein a sufficient amount of companion acid is provided in A to maintain the pH of the aqueous reaction solution at a value of $\leq 4$; and
  C withdrawing at least a portion of the chlorine dioxide from the aqueous product solution and separating chlorine dioxide present in said product solution from the remaining components in said product solution.

18. A process for producing chlorine dioxide as claimed in claim 17, wherein the companion acid provided in Step A is effected by the stepwise addition of the companion acid.

19. A process for producing chlorine dioxide as claimed in claim 18, wherein the companion acid provided in Step A is effected by continuously adding the companion acid after the commencement of the reaction.

20. A process for producing chlorine dioxide as claimed in claim 17, further comprising maintaining the pH of the reaction solution of step B at a value of $\leq 4$ by:

1 flowing inert gas through said either or both of said hydroxy carboxylic acid and said companion acid, wherein a portion of either or both acids is entrained to yield an acid gas that comprises said inert gas and acid; and
  2 flowing said acid gas into the aqueous reaction solution, so that at least a portion of the acid in said acid gas is absorbed into the aqueous reaction solution.

21. A process for producing chlorine dioxide as claimed in claim 17, wherein the weight ratio of water to acid in said aqueous acid solution is about 3.

22. A process for producing chlorine dioxide as claimed in claim 17, wherein the temperature of the vessel is maintained at about 40° C.

23. A process for producing chlorine dioxide as claimed in claim 17, wherein Step C is carried out by flowing an inert carrier gas through said aqueous product solution so that at least a portion of the chlorine dioxide is entrained in the inert gas to provide a product gas stream comprising said inert gas and chlorine dioxide.

24. A process for producing chlorine dioxide as claimed in claim 23, wherein the inert gas is nitrogen gas.

25. A process for producing chlorine dioxide as claimed in claim 23, wherein substantially all of the chlorine dioxide present in said aqueous product solution is entrained in said inert carrier gas.

26. A process for producing chlorine dioxide as claimed in claim 23, further comprising passing the product gas through a trap comprising aqueous liquid, wherein at least a portion of the chlorine dioxide in said product gas stream is absorbed into the aqueous liquid in the trap.

27. A process for producing chlorine dioxide as claimed in claim 26, wherein the trap has a volume within the range of from about 10% to about 200% of the total reactor volume.

28. A process for producing chlorine dioxide as claimed in claim 17, wherein said hydroxy carboxylic acid is lactic acid.

29. A process for producing chlorine dioxide as claimed in claim 28, wherein said companion acid is acetic acid.

30. A process for producing chlorine dioxide, comprising the steps of:
  A providing an aqueous acid solution comprising
    1 a hydroxy carboxylic acid that is capable of temporarily transferring chlorine from an alkali metal salt of chlorite ion, but substantially does not form a salt with an alkali metal salt of a chlorite ion, and
    2 a companion acid that substantially does not react with an alkali metal salt of a chlorite ion;
  B combining, in a vessel, (i) an alkali metal salt of a chlorite ion, and (ii) said aqueous acid solution to yield an aqueous reaction solution;
  C maintaining pH of the aqueous reaction solution at a value of $\leq 4$ during the reaction of (i) and (ii) by,
    1 flowing inert gas through said aqueous acid solution comprising said hydroxy carboxylic acid and said companion acid, wherein a portion of either or both acids is entrained to yield an acid gas that comprises said inert gas and acid, and
    2 flowing said acid gas into the aqueous reaction solution, so that at least a portion of the acid in said acid gas is absorbed into the aqueous reaction solution;
  D maintaining the temperature of the vessel contents within the range of from about 20° C. to about 60° C.,
wherein chlorite ions are produced in said aqueous reaction solution, and said chlorite ions react with said hydroxy carboxylic acid present therein to yield an aqueous product solution that comprises chlorine dioxide but is substantially free of chlorous acid, and E flowing an inert gas through at least a portion of said product solution which has been removed from said vessel, wherein at least a portion of the chlorine dioxide in said product solution is entrained in said inert gas to yield a product gas comprising inert gas and chlorine dioxide and F flowing the product gas into a trap comprising an aqueous liquid to separate at least a portion of the chlorine dioxide from the inert gas, thereby yielding an aqueous chlorine dioxide solution.

31. A process for the continuous production of chlorine dioxide, comprising the steps of:

A providing an aqueous acid solution comprising 1 a hydroxy carboxylic acid that is capable of temporarily transferring chlorine from an alkali metal salt of chlorite ion, but substantially does not form a salt with an alkali metal salt of a chlorite ion, and 2 a companion acid that substantially does not react with an alkali metal salt of a chlorite ion;

B combining, in a vessel, (i) an alkali metal salt of a chlorite ion, and (ii) said aqueous acid solution to yield an aqueous reaction solution;

C maintaining pH of the aqueous reaction solution at a value of $\leq 4$ during the reaction of (i) and (ii);

D maintaining the temperature of the vessel contents at from about 30° C. to about 45 (degree sign), wherein chlorite ions are produced in said aqueous reaction solution, and said chlorite ions react with said hydroxy carboxylic acid present therein to yield an aqueous product solution that comprises chlorine dioxide but is substantially free of chlorous acid;

E transferring at least a portion of the product solution into a chlorine dioxide stripper in which inert gas is passed into intimate contact with acid product solution, thereby yielding a product gas comprising said inert gas and entrained chlorine dioxide, wherein said product gas also may contain unreacted hydroxy carboxylic acid and/or companion acid;

F optionally flowing the product gas into a condenser to condense any unreacted hydroxy carboxylic acid and/or companion acid present therein;

G flowing the product gas, optionally received from the condenser, into a chlorine dioxide absorber, wherein the product gas is contacted with an aqueous liquid to yield an aqueous chlorine dioxide solution and a scrubbed inert gas.

\* \* \* \* \*